US 11,454,177 B2

United States Patent
Du et al.

(10) Patent No.: US 11,454,177 B2
(45) Date of Patent: Sep. 27, 2022

(54) METHOD OF AERO-ENGINE ON-LINE OPTIMIZATION AND MULTIVARIABLE CONTROL BASED ON MODEL PREDICTION

(71) Applicant: Dalian University of Technology, Dalian (CN)

(72) Inventors: Xian Du, Dalian (CN); Yanhua Ma, Dalian (CN); Ximing Sun, Dalian (CN); Zhimin Wang, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 774 days.

(21) Appl. No.: 16/462,519

(22) PCT Filed: Jun. 15, 2018

(86) PCT No.: PCT/CN2018/091442
§ 371 (c)(1),
(2) Date: May 20, 2019

(87) PCT Pub. No.: WO2019/237320
PCT Pub. Date: Dec. 19, 2019

(65) Prior Publication Data
US 2019/0383221 A1 Dec. 19, 2019

(51) Int. Cl.
*F02C 9/00* (2006.01)
*F02C 9/28* (2006.01)
(Continued)

(52) U.S. Cl.
CPC ............... *F02C 9/28* (2013.01); *B64D 31/06* (2013.01); *G05B 17/02* (2013.01); *G06F 17/16* (2013.01);
(Continued)

(58) Field of Classification Search
CPC ... F02C 9/28; F02C 9/00; B64D 31/06; G05B 17/02; G05B 13/042; G05B 23/02;
(Continued)

(56) References Cited

U.S. PATENT DOCUMENTS

| 6,459,963 | B1 | 10/2002 | Bennett et al. |
| 2004/0088060 | A1* | 5/2004 | Renou ................. G05B 13/048 700/30 |
| 2014/0005909 | A1* | 1/2014 | Meisner ................... F02C 9/00 701/100 |

FOREIGN PATENT DOCUMENTS

| CN | 102855349 A * | 1/2013 |
| CN | 103984242 A | 8/2014 |

(Continued)

OTHER PUBLICATIONS

Meisner et al., U.S. Patent Application Publication 2014/0005909, Jan. 2014, see the shortened version.*
(Continued)

*Primary Examiner* — Kandasamy Thangavelu
(74) *Attorney, Agent, or Firm* — Muncy, Geissler, Olds & Lowe, P.C.

(57) ABSTRACT

A design method of aero-engine on-line optimization and multivariable control based on model prediction control realizes aero-engine multivariable control and on-line optimization according to thrust, rotational speed and other needs under the condition of meeting constraints. The first part is a prediction model acquisition layer that continuously establishes a small deviation linear model of an aero-engine
(Continued)

near different steady state points based on the actual operating state of the aero-engine in each control cycle and external environment parameters and that supplies model parameters to a controller; and the second part is a control law decision-making layer which is a closed loop structure that consists of a model prediction controller and an external output feedback. The model prediction controller determines the output of the controller at next moment by solving a linear optimization problem according to an engine model in the current state, a control instruction and relevant constraints.

5 Claims, 9 Drawing Sheets

(51) Int. Cl.
*G05B 17/02* (2006.01)
*G06F 17/16* (2006.01)
*B64D 31/06* (2006.01)
*G06F 30/15* (2020.01)
*G06F 111/10* (2020.01)

(52) U.S. Cl.
CPC ........ *G06F 30/15* (2020.01); *F05D 2220/323* (2013.01); *F05D 2270/44* (2013.01); *G06F 2111/10* (2020.01)

(58) Field of Classification Search
CPC ...... G06F 17/16; G06F 30/15; G06F 2111/10; F05D 2220/323; F05D 2270/44; F05D 2260/80; F05D 2260/81; F05D 2270/20; G06B 13/048
USPC ............................................................ 703/6
See application file for complete search history.

(56) References Cited

FOREIGN PATENT DOCUMENTS

| | | | | |
|---|---|---|---|---|
| CN | 104102769 A | * | 10/2014 | |
| CN | 105114189 A | | 12/2015 | |
| CN | 106647268 A | | 5/2017 | |
| CN | 106886151 A | * | 6/2017 | ........... G05B 13/042 |
| CN | 107193212 A | | 9/2017 | |
| CN | 105652665 B | * | 3/2018 | ........... G05B 13/042 |
| CN | 108762089 A | | 11/2018 | |
| EP | 2447792 A1 | * | 5/2012 | ............. G05B 23/02 |
| EP | 3045982 A1 | * | 7/2016 | ........... G05B 13/048 |

OTHER PUBLICATIONS

Renou et al., U.S. Patent Application Publication 2004/0088060, May 2004, see the shortened version.*
Siqi Fan, "Aeroengine Control: Chapter 3, Dynamic Data Model of Aero-engine", Publisher: Northwestern Polytechnical University Press Co.Ltd, Jun. 1, 2008, 11 pages including English translation.

* cited by examiner

METHOD OF AERO-ENGINE ON-LINE OPTIMIZATION AND MULTIVARIABLE CONTROL BASED ON MODEL PREDICTION

TECHNICAL FIELD

The present invention provides a design method of aero-engine on-line optimization and multivariable control based on model prediction, and belongs to the technical field of control and simulation of aerospace propulsion systems.

BACKGROUND

With the continuous progress of aero-engine technology, the structure of modern aero-engine is increasingly complex, its working range is continuously increased and requirements for aero-engine control systems are higher and higher. The traditional single input/single output control system is difficult to meet the control need. Therefore, selection of more control variables to achieve a multivariate control system for controlling multiple engine parameters becomes an important means to improve the performance of the engine control system. Model prediction control as a model-based multivariable control algorithm not only can realize multivariable effective control for the aero-engine system, but also can treat various constraint problems to be treated in the aero-engine control process, so as to give full play to the potential of the aero-engine and improve the performance of the entire aerospace propulsion system. Although the model prediction control has multiple excellent properties, it has the defect that it is difficult to consider controller performance and real-time performance of the control system. In the present invention, based on the actual input quantity of the engine, a linear model of the engine is continuously established in each control cycle, and a multivariable model predictive controller is designed on the basis of considering an actuator of the control system, thereby realizing real-time on-line optimization and improving the performance of the control system while reducing the calculation of the model prediction control.

SUMMARY

To ensure that the aero-engine is within the entire flight envelop and realize steady state control and transition state control in multiple control quantities under the condition of considering the properties, physical constraints and working limits of the actuator, the present invention proposes a design method of aero-engine on-line optimization and multivariable control based on model prediction.

The technical solution of the present invention is:

A design method of aero-engine on-line optimization and multivariable control based on model prediction, a control system structure mainly consisting of two parts: the first part is a prediction model acquisition layer that continuously establishes a small deviation linear model of an aero-engine near different steady state points based on the actual operating state of the aero-engine in each control cycle and external environment parameters and that supplies model parameters to a controller; and the second part is a control law optimizing and decision-making layer that consists of a model prediction controller and an external output feedback and determines the control output of the controller by solving a linear optimization problem with constraint and closed-loop feedback effect. The specific steps are as follows:

S1. continuously establishing a small deviation linear model of an aero-engine taking the current actual operating state of the aero-engine and the external environment as steady state points in real time; the actual input of the aero-engine comprising a fuel flow of a main combustor, a fuel flow of an afterburner, a cross-sectional area of a nozzle, a fan guide vane angle, a compressor guide vane angle and other aero-engine controllable parameters; the external environment parameters comprising a flight altitude, a flight Mach number and other environmental parameters; obtaining the small deviation linear model of the aero-engine through a method of power extracting and expressing in the form of state space;

S2. normalizing the small deviation linear model of the aero-engine obtained in step S1, i.e., converting absolute increments of an input variable, a state variable and an output variable into relative increments about the steady state points through linear transformation; discretizing the normalized model so that the model parameters are convenient for use in digital control; a sampling cycle of discretization being the same as the control cycle;

S3. designing a model prediction multivariable controller; data stored in the controller comprising: linear model parameters of aero-engine normalization and discretization, a discretization model of an actuator and constraint conditions of the control system, wherein the control structure of the control system, the actuator and the aero-engine are two subsystems which are connected in series; therefore, the aero-engine and the actuator are combined in series in each control cycle into a state space expression of an entire system, and are extended into an augmented state space expression; for the on-line optimization part, constructing a target function of index minimization of the difference between predicted output and actual measured output, the change range of the input and other factors, and taking the limit of the actual input and output of the control system as the optimization constraint condition to online solve the linear optimization problem with constraints to obtain the control output of the next step;

S4. applying the controller output obtained in step S3 to a controlled system and comparing with the actual output of the aero-engine obtained by a sensor to obtain a control error as the input of the model prediction controller; and guiding the controller to make a decision on the controller output of the next step.

The step of establishing a small deviation linear model of an aero-engine taking the actual input of the aero-engine and the external environment as steady state points is as follows:

S1.1 the corresponding steady state value of the fuel supplied to the aero-engine by the control system at the last moment is taken as the steady state point parameter of the small deviation linear model, and a corresponding dynamics balance equation is established according to a rotor of the aero-engine as an energy storage component:

$$\frac{\pi}{30} J\dot{n} = \Delta M$$

where is a diagonal matrix formed by a rotational inertia of the rotor, the dimension of the diagonal matrix depends on the number of rotors of the aero-engine, $J\dot{n}$ is a derivative vector of each rotor of the aero-engine with respect to time, and $\Delta M$ is a residual moment vector of each rotor;

S1.2 the residual moment of each rotor is expressed according to an engine principle as follows:

$$\Delta M = \Delta M(n, u_{in}, u_{out})$$

where n is a vector formed by the rotational speed of each rotor of the aero-engine, $u_{in}$ is a vector formed by the control quantity and $u_{out}$ is a vector formed by an external environment variable to be considered;

S1.3 since the inertia of an aircraft is much larger than that of the aero-engine, the change of the environmental parameters is not considered when the dynamics equation is established, and the expression of the residual moment of the rotor is approximately linearized to:

$$\Delta M = Jac \begin{bmatrix} \Delta n \\ \Delta u_{in} \end{bmatrix}$$

where Jac is a Jacobian matrix of Mf with respect to n and $u_{in}$, $\Delta n$ and $\Delta u_{in}$ are column vectors, the element of $\Delta n$ is the absolute increment of the rotational speed of each rotor relative to the rotational speed of the steady state point, and the element of $\Delta u_{in}$ is the absolute increment of each control quantity relative to the control quantity of the steady state point;

S1.4 an item $$\frac{\pi}{30} J$$

is moved to the right end of the equal sign, and Jac is divided into a matrix A and a matrix B to obtain the following rotor dynamics equation:

$$\dot{n} = A\Delta n + B\Delta u_{in}$$

S1.5 under the condition of only considering the rotor inertia, the pressure and the temperature of each section of the aero-engine and the thrust of the aero-engine are functions of the rotational speed, the input and the environmental parameters, and expressed as: $y = y(n, u_{in}, u_{out})$; y is expressed as an arbitrary parameter of the aero-engine other than the rotational speed; after the disturbance of the environmental parameters in the current control cycle are neglected, the expression of the aero-engine parameters are linearized as:

$$\Delta y = C\Delta n + D\Delta u_{in}$$

where $\Delta y$ is a column vector, and the element thereof is an absolute increment of each aero-engine parameter other than the rotational speed relative to the steady state point;

S1.6 elements of the matrixes A, B, C, D are determined by corresponding partial derivatives; the corresponding partial derivatives are obtained by change values of the steady state parameters caused by small disturbance; the rotor dynamics equation of the aero-engine in step S1.4 is combined with the engine parameter expression in step S1.5 to obtain state space expressions of the small deviation linear model of the aero-engine:

$$\begin{cases} \dot{n} = A\Delta n + B\Delta u_{in} \\ y = C\Delta n + D\Delta u_{in} \end{cases}.$$

The step of conducting normalization and discretization on the obtained small deviation linear model of the aero-engine is as follows:

S2.1 absolute increments of an input vector, a state vector and an output vector obtained in step S1 in the state space expressions are converted into relative increments; the expressions of nondimensional relative increments are indicated as follows:

$$\dot{n}_s = \frac{\dot{n}}{n_m}, \quad \Delta n_s = \frac{\Delta n}{n_m}, \quad \Delta u_{ins} = \frac{\Delta u_{in}}{u_m}, \quad y_s = \frac{\Delta y}{y_m}$$

where the subscript S indicates a vector after nondimensionalization; the subscript in indicates the state quantity, the input quantity and the output quantity of the aero-engine on the steady state points;

S2.2 the state space expressions of the aero-engine near the steady state points are converted into the following form:

$$\dot{n} = A_e \Delta n + B_e \Delta u_{in}$$

$$y = C_e \Delta n + D_e \Delta u_{in}$$

where $A_e = N^{-1}AN$, $B_e = N^{-1}BU$, $C_e = Y^{-1}CN$, $D_e = Y^{-1}DU$ and N,Y,U are respectively diagonal matrixes formed by the state quantity, the output quantity and the input quantity on the steady state points;

S2.3 since a model prediction control algorithm is a computer control algorithm, the model needs to be discretized; the sampling cycle of discretization shall be consistent with the control cycle of the control system; and general forms of the state space expressions after discretization are indicated as follows:

$$\begin{cases} n(k+1) = A_{ed}n(k) + B_{ed}u_{in}(k) \\ y(k) = C_{ed}n(k) + D_{ed}u_{in}(k) \end{cases}.$$

The step of designing a model prediction multivariable controller and on-line optimization is as follows:

S3.1 the influence of the actuator is considered; the actuator is approximated as a first-order inertial link; the state space expressions of the actuator are written as follows:

$$\begin{cases} \dot{x} = A_a x + B_a u \\ y' = x \end{cases}$$

where $A_a$ is a diagonal matrix formed by a time constant negative derivative of the actuator; $B_a$ is a diagonal matrix formed by a time constant derivative of the actuator, and can be discretized in accordance with the same sampling time as the control cycle as follows:

$$\begin{cases} x(k+1) = A_{ad}x(k) + B_{ad}u(k) \\ y'(k) = x(k) \end{cases}$$

where $A_{ad}$ and $B_{ad}$ are respectively a system matrix and an input matrix after discretization of the state space expressions of the actuator;

S3.2 the actuator and the engine model are integrated in series into a unified state space expression as follows:

$$x_t(k+1)=A_t x_t(k)+B_t u_t(k)$$

$$y(k)=C_t x_t(k)$$

where, $x_t=[x,\Delta n]^T$, $u_t=\Delta u_m^T$, $y_t=[\Delta n,\Delta y]^T$, $$A_t = \begin{bmatrix} A_{ad} & 0 \\ B_{ed}C_{ad} & A_{ed} \end{bmatrix},$$

$$B_t = \begin{bmatrix} B_{ad} \\ 0 \end{bmatrix},$$

$$C_t = [D_{ed}C_{ad}, C_{ed}];$$

S3.3 further, the state vector and the input vector are composed into a new augmented state vector, and the increment of the input vector is used as a new input vector to obtain augmented state space expressions:

$$\begin{bmatrix} x_t(k+1) \\ u_t(k) \end{bmatrix} = \begin{bmatrix} A_t & B_t \\ 0 & I \end{bmatrix}\begin{bmatrix} x_t(k) \\ u_t(k-1) \end{bmatrix} + \begin{bmatrix} B_t \\ I \end{bmatrix}\Delta u_t(k)$$

$$y_t(k) = C_t x_t(k)$$

where $\Delta u(k)$ is an increment vector of the control quantity within the kth control cycle, and a new state space expression is written as a compact form:

$$x_t'(k+1)=A_t' x_t'(k)+B_t' \Delta u(k)$$

$$y_t(k)=C_t x_t(k)$$

according to the state space expression of the aero-engine, a predictive field is set as p and a control field is set as q to obtain a general form of a prediction formula of a state sequence and an output sequence as follows:
where, $$\hat{x} = P_{xx}x_t'(k) + H_x\hat{u}$$

$$\hat{y} = Px_t'(k) + H\hat{u}$$

where, $\hat{x} = \left[x_t'^T(k+1), x_t'^T(k+2), \ldots, x_t'^T(k+p)\right]^T$ $\hat{u} = \left[\Delta u^T(k), \Delta u^T(k+1), \ldots, \Delta u^T(k+p-1)\right]^T$ $\hat{y} = \left[y_t'^T(k+1), y_t'^T(k+2), \ldots, y_t'^T(k+p)\right]^T$ $$P_{xx} = \begin{bmatrix} A_t' \\ A_t'^2 \\ \vdots \\ A_t'^p \end{bmatrix},$$

$$H_x = \begin{bmatrix} B_t' & 0 & \ldots & \ldots & \ldots & 0 \\ A_t'B_t' & B_t' & \ldots & \ldots & \ldots & 0 \\ A_t'^2 B' & A_t'B' & \ldots & \ldots & \ldots & 0 \\ \vdots & \vdots & \vdots & \vdots & \vdots & 0 \\ A_t'^{p-1}B' & A_t'^{p-2}B' & \ldots & A_t'^{p-q}B' & \ldots & 0 \end{bmatrix}$$

$$P = \begin{bmatrix} C_tA_t' \\ C_tA_t'^2 \\ \vdots \\ C_tA_t'^p \end{bmatrix},$$

$$H = \begin{bmatrix} C_tB_t' & 0 & \ldots & \ldots & \ldots & 0 \\ C_tA_t'B_t' & C_tB_t' & \ldots & \ldots & \ldots & 0 \\ C_tA_t'^2 B' & C_tA_t'B' & \ldots & \ldots & \ldots & 0 \\ \vdots & \vdots & \vdots & \vdots & \vdots & 0 \\ C_tA_t'^{p-1}B' & C_tA_t'^{p-2}B' & \ldots & C_tA_t'^{p-q}B' & \ldots & 0 \end{bmatrix}$$

according to the state space expressions, the prediction formula of the state sequence, and the prediction formula of the output sequence of the system, an on-line optimization target can be described as the following simplified form of the target function:

$$J=[r-Px_t'(k)-H\hat{u}]^T[r-Px_t'(k)-H\hat{u}]-\lambda\hat{u}^T\hat{u}$$

where, r is a controller input of a reference sequence; after expansion and combination, and elimination of the term that has no influence on J, the target function can be finally simplified as the following quadratic form:

$$J=\hat{u}^T[H^TH+\lambda I]\hat{u}+2[x_t^TP^TH-r^TH]\hat{u}$$

an input constraint is expressed as the following compact form:

$$C_c\hat{u}L(\overline{U}-u(k-1))$$

$$-C_c\hat{u}\leq L(\overline{U}-u(k-1))$$

where, $$C_c = \begin{bmatrix} I & 0 & 0 & \ldots \\ I & I & 0 & \ldots \\ \ldots & \ldots & \ldots & \ldots \\ I & I & I & \ldots \end{bmatrix}, L = \begin{bmatrix} I \\ I \\ \vdots \\ I \end{bmatrix};$$

$\overline{U}$ and $\underline{U}$ are respectively an input quantity upper limit and an input matrix lower limit;
an output constraint is expressed as the following form:

$$H\hat{u} \leq \begin{bmatrix} \overline{Y} \\ \overline{Y} \\ \vdots \\ \overline{Y} \end{bmatrix} - Px_t'(k)$$

$$-H\hat{u} \leq -\begin{bmatrix} \underline{Y} \\ \underline{Y} \\ \vdots \\ \underline{Y} \end{bmatrix} + Px_t'(k)$$

where, $\overline{Y}$ and $\underline{Y}$ are respectively output quantity upper limit and lower limit;
according to the target function and the constraint condition, on-line rolling optimization can be realized by solving a quadratic programming problem; and a header element of the control quantity increment sequence obtained by optimization, and the control quantity of the previous control cycle are summed to use the sum as an actual control quantity within the next control cycle.

The present invention has the following beneficial effects that:

(1) The present invention proposes a design method of aero-engine on-line optimization and multivariable control based on model prediction. The traditional interpolation method or fitting method is not adopted for acquisition of the prediction model. A steady state model under the current state input condition is acquired in real time as an important component part of a current prediction model through the method of power extracting according to the existing non-linear component-level model of the aero-engine. The design method is closer to the actual characteristic graph of the engine compared with the traditional interpolation method and the fitting method, and can greatly reduce the calculation time and improve the real-time performance of on-line optimization compared with a solution of solving the nonlinear optimization problem by directly using the non-linear model of the engine.

(2) The present invention notes the necessity of normalization of the linear mode of the engine and considers the influence of the dynamic performance of the actuator on the control system in the process of constructing the prediction model. In the aero-engine model, the input vector, the output vector and the state vector have different units, and the orders of magnitude of some elements in the vectors are quite different, thereby causing great differences in the orders of magnitude of matrix elements and even generating an ill-conditioned matrix which may affect the accuracy of further calculation. To this end, the present invention introduces the normalization link in the process of generating the linear model to improve the operation accuracy. At the same time, although the time constant of the actuator is often less than the time constant of the aero-engine, for the model-based control algorithm, the introduction of the actuator still influences the control effect of the control system. In the present invention, the actuator and the engine as two systems connected in series are combined into a whole, which achieves a better control effect in spite of increasing the orders of the systems.

(3) Saturation constraints of the actuator and the safety boundary and constraint conditions of related parameters of the aero-engine can be directly introduced into the model prediction multivariable controller designed by the present invention to realize on-line optimization without advanced off-line planning of acceleration and deceleration plan curve and limit protection which ensure safe operation of the system, thereby greatly reducing the design complexity of the control system, giving full play to engine potential and facilitating the improvement of the entire performance of the flight propulsion system.

(4) The multivariate control system structure of the aero-engine based on model prediction designed by the present invention has a large closed loop for actual engine output, and can reflect the real response of the engine to the controller output so as to adjust the expected instruction of the model predictive controller, compensate the influence of model mismatch and external disturbance on the system and improve the control accuracy of the control system.

DETAILED DESCRIPTION

Figure 1:
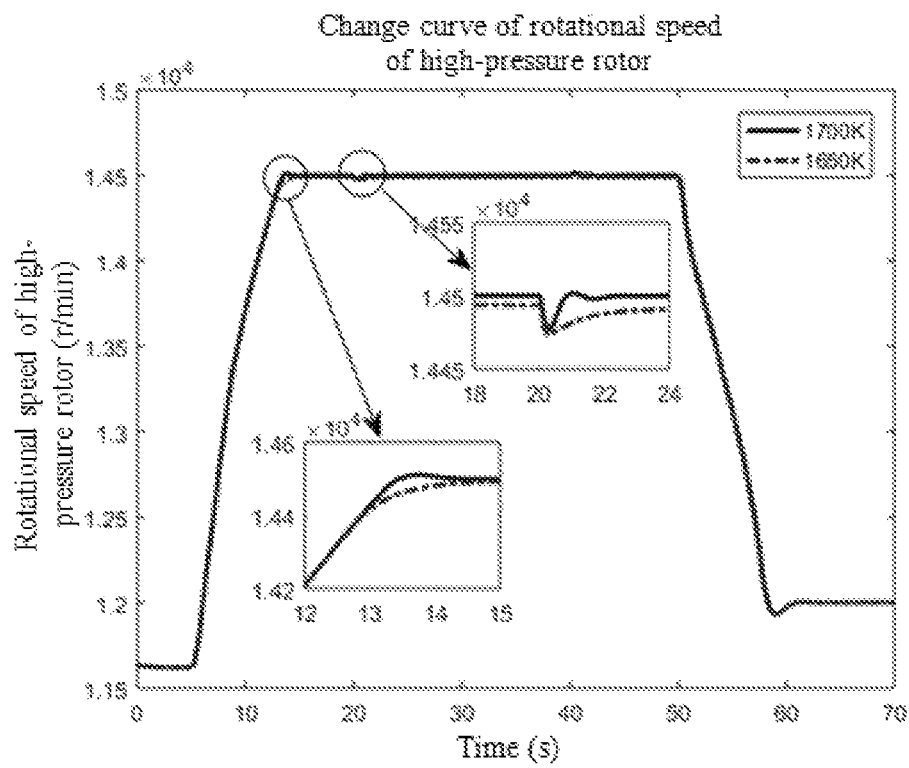
FIG. 1 is a change curve of rotational speed of a high-pressure rotor.

Specific embodiments of the present invention are further described below in combination with accompanying drawings and the technical solution.

The present embodiment relates to a design method of aero-engine on-line optimization and multivariable controller based on model prediction. Specific detailed design steps are as follows:

Step 1: establishing a small deviation linear model of an aero-engine taking the current actual input of the aero-engine and the external environment parameters as steady state points; and firstly obtaining the steady state points for calculating a small deviation linear model. In the present invention, the small deviation model at the current time is calculated by approximately taking the input quantity at the previous sampling moment of the engine and the environmental parameters as the steady state points. The method for calculating the small deviation model of the engine near the steady state points is described below.

In the working process of the aero-engine, the thermal inertia of components is much smaller than the inertia of the rotor. Therefore, the heat transfer process is ignored in modeling and the engine rotor is taken as an energy storage component. The engine in the embodiment is a typical two-rotor engine. Therefore, the dynamic performance of the engine depends on the torque balance equation of two rotors, i.e.:

$$\begin{cases} \dfrac{\pi}{30} J_H \dfrac{dn_H}{dt} = \Delta M_H \\ \dfrac{\pi}{30} J_L \dfrac{dn_L}{dt} = \Delta M_L \end{cases} \quad (1)$$

where, $J_H$ and $J_L$ are respectively the rotational inertia of a high-pressure rotor and a low-pressure rotor of the engine; $\Delta M_H$ and $\Delta M_L$ are respectively the remaining torques of the high-pressure rotor and the low-pressure rotor.

According to the engine principle, the remaining torques of the high-pressure rotor and the low-pressure rotor can be expressed as:

$$\begin{cases} \Delta M_H = M_{TH} - M_{CH} - M_{fr,H} = \Delta M_H(n_H, n_L, q_{mf}, A_8, p_2, T_2) \\ \Delta M_L = M_{TL} - M_{CL} - M_{fr,L} = \Delta M_L(n_H, n_L, q_{mf}, A_8, p_2, T_2) \end{cases} \quad (2)$$

where, $M_{TH}$ and $M_{TL}$ are respectively the torques of a high-pressure turbine and a low-pressure turbine; $M_{CH}$ and $M_{CL}$ are respectively the torques of a high-pressure compressor and a low-pressure compressor. $M_{fr,H}$ and $M_{fr,L}$ are respectively friction torques of the high-pressure rotor and the low-pressure rotor. Since the values are much smaller than the other four terms, the values are ignored in the process of calculating the linear model. It is known from formula (2) that $\Delta M_H$ and $\Delta M_L$ are respectively the rotational speed of the high-pressure rotor and the low-pressure rotor, and are nonlinear functions of main fuel flow, the sectional area of the nozzle and the pressure and temperature of the working environment. Therefore, the formula (2) can be expanded according to Taylor formula into the following linear form:

$$\Delta M_H = \left(\frac{\partial \Delta M_H}{\partial n_H}\right)_0 \Delta n_H + \left(\frac{\partial \Delta M_H}{\partial n_L}\right)_0 \Delta n_L + \left(\frac{\partial \Delta M_H}{\partial q_{mf}}\right)_0 \Delta q_{mf} + \quad (3)$$
$$\left(\frac{\partial \Delta M_H}{\partial A_8}\right)_0 \Delta A_8 + \left(\frac{\partial \Delta M_H}{\partial p_2}\right)_0 \Delta p_2 + \left(\frac{\partial \Delta M_H}{\partial T_2}\right)_0 \Delta T_2$$

$$\Delta M_L = \left(\frac{\partial \Delta M_L}{\partial n_H}\right)_0 \Delta n_H + \left(\frac{\partial \Delta M_L}{\partial n_L}\right)_0 \Delta n_L + \left(\frac{\partial \Delta M_L}{\partial q_{mf}}\right)_0 \Delta q_{mf} + \quad (4)$$
$$\left(\frac{\partial \Delta M_L}{\partial A_8}\right)_0 \Delta A_8 + \left(\frac{\partial \Delta M_L}{\partial p_2}\right)_0 \Delta p_2 + \left(\frac{\partial \Delta M_L}{\partial T_2}\right)_0 \Delta T_2$$

where, $\Delta n_H$, $\Delta n_L$, $\Delta q_{mf}$, $\Delta A_8$, $\Delta p_2$ and $\Delta T_2$ are respectively absolute increments of variables relative to the steady state points.

Since the inertia of the aircraft is much larger than that of the engine, the flight conditions can be assumed to remain unchanged during the current control cycle when the dynamics equation is established, i.e., the influences of $p_2$ and $T_2$ are not considered temporarily. By combining the above listed formulas, the motion equations of the high-pressure rotor and the low-pressure rotor can be obtained as follows:

$$\begin{cases} \dot{n}_H = a_{11}\Delta n_H + a_{12}\Delta n_L + b_{11}\Delta q_{m,f} + b_{12}\Delta A_8 \\ \dot{n}_L = a_{21}\Delta n_H + a_{22}\Delta n_L + b_{21}\Delta q_{m,f} + b_{22}\Delta A_8 \end{cases} \quad (5)$$

where, $$a_{11} = \frac{30}{\pi J_H}\left(\frac{\partial \Delta M_H}{\partial n_H}\right)_0, \; a_{12} = \frac{30}{\pi J_H}\left(\frac{\partial \Delta M_H}{\partial n_L}\right)_0 \quad (6)$$

$$b_{11} = \frac{30}{\pi J_H}\left(\frac{\partial \Delta M_H}{\partial q_{mf}}\right)_0, \; b_{12} = \frac{30}{\pi J_H}\left(\frac{\partial \Delta M_H}{\partial A_8}\right)_0 \quad (7)$$

$$a_{21} = \frac{30}{\pi J_L}\left(\frac{\partial \Delta M_L}{\partial n_H}\right)_0, \; a_{22} = \frac{30}{\pi J_L}\left(\frac{\partial \Delta M_L}{\partial n_L}\right)_0 \quad (8)$$

$$b_{21} = \frac{30}{\pi J_L}\left(\frac{\partial \Delta M_L}{\partial n_{mf}}\right)_0, \; b_{22} = \frac{30}{\pi J_L}\left(\frac{\partial \Delta M_L}{\partial A_8}\right)_0 \quad (9)$$

Under the condition of only considering the rotor inertia, the pressure and the temperature of each section of the aero-engine and the thrust of the aero-engine are functions of the rotational speed, the input and the environmental disturbance, and can be expressed as:

$$x = x(n_H, n_L, q_{mf}, A_8, p_2, T_2) \quad (10)$$

x is expressed as an arbitrary parameter of the aero-engine other than the rotational speed; and after the change of the working environment in the current control cycle is neglected, the expression can be further linearized as:

$$\Delta x = \left(\frac{\partial x}{\partial n_H}\right)_0 \Delta n_H + \left(\frac{\partial x}{\partial n_L}\right)_0 \Delta n_L + \left(\frac{\partial x}{\partial q_{m,f}}\right)_0 \Delta q_{mf} + \left(\frac{\partial x}{\partial A_8}\right)_0 \Delta A_8 \quad (11)$$

Then, a linear dynamics equation of other engine parameters including the temperature before turbine and exit pressure ratio of the turbine can be obtained.

After the approximately linear function expressions of aero-engine state variables and output variables are obtained, the present invention constructs a linear model of the engine through a linear state space expression.

In a biaxial engine, the state vector is composed of two elements when only two independent rotor components are considered as energy storage elements. The present invention selects the rotational speed $\Delta n_H$ and $\Delta n_L$ of two rotors of the two-rotor engine as state variables, and the state equation can be expressed as:

$$\begin{bmatrix} \dot{n}_H \\ \dot{n}_L \end{bmatrix} = \begin{bmatrix} a_{11} & a_{12} \\ a_{21} & a_{22} \end{bmatrix}\begin{bmatrix} \Delta n_H \\ \Delta n_L \end{bmatrix} = \begin{bmatrix} b_{11} & b_{12} \\ b_{21} & b_{22} \end{bmatrix}\begin{bmatrix} \Delta q_{mf} \\ \Delta A_8 \end{bmatrix} \quad (12)$$

When the rotational speed of the high-pressure rotor and the low-pressure rotor, the temperature before turbine and the exit pressure ratio of the turbine are selected as output variables in the embodiment, the following output equation can be obtained:

$$\begin{bmatrix} \Delta n_H \\ \Delta n_L \\ \Delta T_4 \\ \Delta \pi_T \end{bmatrix} = \begin{bmatrix} 1 & 0 \\ 0 & 1 \\ c_{31} & c_{32} \\ c_{41} & c_{42} \end{bmatrix}\begin{bmatrix} \Delta n_H \\ \Delta n_L \end{bmatrix} + \begin{bmatrix} 0 & 0 \\ 0 & 0 \\ d_{31} & d_{32} \\ d_{41} & d_{42} \end{bmatrix}\begin{bmatrix} \Delta q_{mf} \\ \Delta A_8 \end{bmatrix} \quad (13)$$

where, $$c_{31} = \left(\frac{\partial T_4}{\partial n_H}\right)_0, \; c_{32} = \left(\frac{\partial T_4}{\partial n_L}\right)_0 \quad (14)$$

$$c_{41} = \left(\frac{\partial \pi_T}{\partial n_H}\right)_0, \; c_{42} = \left(\frac{\partial \pi_T}{\partial n_L}\right)_0 \quad (15)$$

$$d_{31} = \left(\frac{\partial T_4}{\partial q_{mf}}\right)_0, \; d_{32} = \left(\frac{\partial T_4}{\partial A_8}\right)_0 \quad (16)$$

$$d_{41} = \left(\frac{\partial \pi_T}{\partial q_{mf}}\right)_0, \; d_{42} = \left(\frac{\partial \pi_T}{\partial A_8}\right)_0 \quad (17)$$

After the linear equation described by the state space expression of the biaxial engine is obtained, the coefficients in the model expression, i.e., the partial derivatives, can be obtained through the following work. The adopted method for acquiring the partial derivatives of the steady state points is to extract the power of the high-pressure rotor and the low-pressure rotor of the engine based on the nonlinear calculation procedure of the engine, change the fuel flow and the sectional area of the nozzle, acquire the rotational speed of the high-pressure rotor and the low-pressure rotor, the temperature before turbine and the change quantity of the total pressure ratio of the compressor through balancing calculation and solve the partial derivatives according to the change quantity. Balancing calculation will include the calculation of the following five states:

State I: according to the given steady state operation points, the steady state parameter values of the engine at the calculation points are obtained, and recorded as $n_{H0}$, $n_{L0}$, $T_{40}$ and $\pi_{T0}$.

State II: other conditions remain unchanged; a small amount of power is extracted on the low-pressure shaft; and the engine speed and other parameter values are calculated when a small amount of power is extracted on the low-pressure shaft, and recorded as $n_{H1}$, $n_{L1}$, $T_{41}$ and $\pi_{T1}$.

State III: other conditions remain unchanged; a small amount of power is extracted on the high-pressure shaft; and the engine parameter values are calculated when the power is extracted on the high-pressure shaft and recorded as $n_{H2}$, $n_{L2}$, $T_{42}$ and $\pi_{T2}$.

State IV: other conditions remain unchanged; and when there is a small change in fuel flow relative to the state, the engine parameter values $n_{H3}$, $n_{L3}$, $T_{43}$ and $\pi_{T3}$ are calculated when the fuel flow deviates from the steady state value.

State V: other conditions remain unchanged; and when there is a small change in the sectional area of the nozzle relative to the state, the engine parameter values $n_{H4}$, $n_{L4}$, $T_{44}$ and $\pi_{T4}$ are calculated when the sectional area of the nozzle deviates from the steady state value.

After the deviation values of states II, III, IV and V relative to state I are sorted out and calculated, the following three equation sets can be obtained:

$$\begin{cases} 0 = \left(\frac{\partial \Delta M_H}{\partial n_H}\right)_0 \Delta n_{H1} + \left(\frac{\partial \Delta M_H}{\partial n_L}\right)_0 \Delta n_{L1} \\ \Delta M_L = \left(\frac{\partial \Delta M_L}{\partial n_H}\right)_0 \Delta n_{H1} + \left(\frac{\partial \Delta M_L}{\partial n_L}\right)_0 \Delta n_{L1} \\ \Delta M_H = \left(\frac{\partial \Delta M_H}{\partial n_H}\right)_0 \Delta n_{H2} + \left(\frac{\partial \Delta M_H}{\partial n_L}\right)_0 \Delta n_{L2} \\ 0 = \left(\frac{\partial \Delta M_L}{\partial n_H}\right)_0 \Delta n_{H2} + \left(\frac{\partial \Delta M_L}{\partial n_L}\right)_0 \Delta n_{L2} \\ 0 = \left(\frac{\partial \Delta M_H}{\partial n_H}\right)_0 \Delta n_{H3} + \left(\frac{\partial \Delta M_H}{\partial n_L}\right)_0 \Delta n_{L3} + \left(\frac{\partial \Delta M_H}{\partial q_{mf}}\right)_0 \Delta q_{mf} \\ 0 = \left(\frac{\partial \Delta M_L}{\partial n_H}\right)_0 \Delta n_{H3} + \left(\frac{\partial \Delta M_L}{\partial n_L}\right)_0 \Delta n_{L3} + \left(\frac{\partial \Delta M_L}{\partial q_{mf}}\right)_0 \Delta q_{mf} \\ 0 = \left(\frac{\partial \Delta M_H}{\partial n_H}\right)_0 \Delta n_{H4} + \left(\frac{\partial \Delta M_H}{\partial n_L}\right)_0 \Delta n_{L4} + \left(\frac{\partial \Delta M_H}{\partial A_8}\right)_0 \Delta A_8 \\ 0 = \left(\frac{\partial \Delta M_L}{\partial n_H}\right)_0 \Delta n_{H4} + \left(\frac{\partial \Delta M_L}{\partial n_L}\right)_0 \Delta n_{L4} + \left(\frac{\partial \Delta M_L}{\partial A_8}\right)_0 \Delta A_8 \end{cases} \quad (18)$$

$$\begin{cases} \Delta T_{41} = \left(\frac{\partial T_4}{\partial n_H}\right)_0 \Delta n_{H1} + \left(\frac{\partial T_4}{\partial n_L}\right)_0 \Delta n_{L1} \\ \Delta T_{42} = \left(\frac{\partial T_4}{\partial n_H}\right)_0 \Delta n_{H2} + \left(\frac{\partial T_4}{\partial n_L}\right)_0 \Delta n_{L2} \\ \Delta T_{43} = \left(\frac{\partial T_4}{\partial n_H}\right)_0 \Delta n_{H3} + \left(\frac{\partial T_4}{\partial n_L}\right)_0 \Delta n_{L3} + \left(\frac{\partial T_4}{\partial q_{mf}}\right)_0 \Delta q_{mf} \\ \Delta T_{44} = \left(\frac{\partial T_4}{\partial n_H}\right)_0 \Delta n_{H4} + \left(\frac{\partial T_4}{\partial n_L}\right)_0 \Delta n_{L4} + \left(\frac{\partial T_4}{\partial A_8}\right)_0 \Delta A_8 \end{cases} \quad (19)$$

$$\begin{cases} \Delta \pi_{T1} = \left(\frac{\partial \pi_T}{\partial n_H}\right)_0 \Delta n_{H1} + \left(\frac{\partial \pi_T}{\partial n_L}\right)_0 \Delta n_{L1} \\ \Delta \pi_{T2} = \left(\frac{\partial \pi_T}{\partial n_H}\right)_0 \Delta n_{H2} + \left(\frac{\partial \pi_T}{\partial n_L}\right)_0 \Delta n_{L2} \\ \Delta \pi_{T3} = \left(\frac{\partial \pi_T}{\partial n_H}\right)_0 \Delta n_{H3} + \left(\frac{\partial \pi_T}{\partial n_L}\right)_0 \Delta n_{L3} + \left(\frac{\partial \pi_T}{\partial q_{mf}}\right)_0 \Delta q_{mf} \\ \Delta \pi_{T4} = \left(\frac{\partial \pi_T}{\partial n_H}\right)_0 \Delta n_{H4} + \left(\frac{\partial \pi_T}{\partial n_L}\right)_0 \Delta n_{L4} + \left(\frac{\partial \pi_T}{\partial A_8}\right)_0 \Delta A_8 \end{cases} \quad (20)$$

After the three linear equation sets shown above are obtained, the undetermined partial derivatives are solved through programming by elimination with maximal column pivoting to complete the linearization of the model near the aero-engine steady state operation point.

Step 2: normalizing and discretizing the small deviation linear model of the aero-engine obtained in step 1. Various elements in the input vector, the output vector and even the state vector use different units, and the orders of magnitude of different variables are quite different, thereby causing great differences in the orders of magnitude of the elements in the parameter matrix of the linear model of the engine, easily forming an ill-conditioned matrix and extremely easily affecting the calculating accuracy. Therefore, the model needs to be normalized.

The elements in the input vector, the state vector and the output vector in the formulas (12) and (13) are absolute increments. In practical application, the orders of magnitude of the absolute increments are quite different, which is easy to cause large errors in the computational process. Therefore, the linear normalization model of the engine is obtained by converting the absolute increments into the relative increments of the steady state operation points in the present invention. Firstly, the absolute increments need to be nondimensionalized into relative increments, and the expressions of the relative increments are as follows:

$$\dot{x}_{si} = \frac{\dot{x}_i}{x_{mi}}, \; x_{si} = \frac{x_i}{x_{mi}}, \; u_{si} = \frac{u_i}{u_{mi}}, \; y_{si} = \frac{y_i}{y_{mi}} \quad (21)$$

where, $\dot{x}_i$, $x_i$, $u_i$ and $y_i$ are elements in the corresponding vectors; $x_{mi}$, $u_{mi}$ and $y_{mi}$ are respectively parameter values of the steady state points; and $\dot{x}_{si}$, $x_{si}$, $u_{si}$ and $y_{si}$, are respectively relative increments of the elements in the vectors.

The collated state space expression can be expressed as follows:

$$\begin{bmatrix} \Delta \dot{n}_{Hs} \\ \Delta \dot{n}_{Ls} \end{bmatrix} = A_e \begin{bmatrix} \Delta n_{Hs} \\ \Delta n_{Ls} \end{bmatrix} + B_e \begin{bmatrix} \Delta q_{mfs} \\ \Delta A_{8s} \end{bmatrix} \quad (22)$$

$$\begin{bmatrix} \Delta n_{Hs} \\ \Delta n_{Ls} \\ \Delta T_{4s} \\ \Delta \pi_{Ts} \end{bmatrix} = C_e \begin{bmatrix} \Delta n_{Hs} \\ \Delta n_{Ls} \end{bmatrix} + D_e \begin{bmatrix} \Delta q_{mfs} \\ \Delta A_{8s} \end{bmatrix} \quad (23)$$

where:

$$A_e = \begin{bmatrix} n_H & 0 \\ 0 & n_L \end{bmatrix}^{-1} A \begin{bmatrix} n_H & 0 \\ 0 & n_L \end{bmatrix}, \; B_e = \begin{bmatrix} n_H & 0 \\ 0 & n_L \end{bmatrix}^{-1} B \begin{bmatrix} q_{mf} & 0 \\ 0 & A_8 \end{bmatrix} \quad (24)$$

$$C_e = \begin{bmatrix} n_H & 0 & 0 & 0 \\ 0 & n_L & 0 & 0 \\ 0 & 0 & T_4 & 0 \\ 0 & 0 & 0 & \pi_T \end{bmatrix}^{-1} C \begin{bmatrix} n_H & 0 \\ 0 & n_L \end{bmatrix}, \quad (25)$$

$$D_e = \begin{bmatrix} n_H & 0 & 0 & 0 \\ 0 & n_L & 0 & 0 \\ 0 & 0 & T_4 & 0 \\ 0 & 0 & 0 & \pi_T \end{bmatrix}^{-1} D \begin{bmatrix} q_{m,f} & 0 \\ 0 & A_8 \end{bmatrix}$$

Since the model prediction control algorithm is a computer control algorithm, the model needs to be discretized. The sampling cycle of discretization shall be consistent with the control cycle of the control system. General forms of the state space expressions after discretization are indicated as follows:

$$\begin{cases} x(k+1) = A_{ed} x(k) + B_{ed} u(k) \\ y(k) = C_{ed} x(k) + D_{ed} u(k) \end{cases} \quad (26)$$

where $A_{ed}$, $B_{ed}$, $C_{ed}$ and $D_{ed}$ are discretized parameter matrixes.

Step 3: designing a model prediction multivariable controller. The main work of the model prediction controller includes constructing the overall prediction model and conducting linear optimization with constraints in the finite time domain according to the expected instruction of the input controller to determine the output of the next controller.

Since the influence of the actuator is considered in the control system designed by the present invention and the actuator is approximated as a first-order inertial link, the actuator also needs to be considered into the prediction model. Firstly, the approximate model of the actuator is written into the state space expression shown below:

$$\begin{bmatrix} \dot{x}_1 \\ \dot{x}_2 \end{bmatrix} = \begin{bmatrix} -\frac{1}{T_1} & 0 \\ 0 & -\frac{1}{T_2} \end{bmatrix} \begin{bmatrix} x_1 \\ x_2 \end{bmatrix} + \begin{bmatrix} \frac{1}{T_1} & 0 \\ 0 & \frac{1}{T_2} \end{bmatrix} \begin{bmatrix} u_1 \\ u_2 \end{bmatrix} \qquad (27)$$

$$\begin{bmatrix} y_1 \\ y_2 \end{bmatrix} = \begin{bmatrix} 1 & 0 \\ 0 & 1 \end{bmatrix} \begin{bmatrix} x_1 \\ x_2 \end{bmatrix} \qquad (28)$$

Formulas (27) and (28) are discretized to obtain:

$$\begin{bmatrix} x_1(k+1) \\ x_2(k+1) \end{bmatrix} = A_{ad} \begin{bmatrix} x_1(k) \\ x_2(k) \end{bmatrix} + B_{ad} \begin{bmatrix} u_1(k) \\ u_2(k) \end{bmatrix} \qquad (29)$$

$$\begin{bmatrix} y_1(k) \\ y_2(k) \end{bmatrix} = C_a \begin{bmatrix} x_1(k) \\ x_2(k) \end{bmatrix} \qquad (30)$$

where $A_{ad}$ and $B_{ad}$ are discretized parameter matrixes of the actuator.

Since the actuator and the engine are connected in series in the system, the state space expressions of the actuator and the engine can be combined in series to form the prediction model of the model prediction controller as follows:

$$x_t(k+1) = A_t x_t(k) + B_t u_t(k) \qquad (31)$$

$$y_t(k) = C_t x_t(k) \qquad (32)$$

where, $x_t = [x_1, x_2, \Delta n_{Hs}, \Delta n_{Ls}]^T$, $u_t = [q_{mfs}, A_8]^T$, $y_t = [\Delta n_{Hs}, \Delta n_{Ls}, \Delta T_{4s}, \Delta \pi_{Ts}]^T$, $A_t = \begin{bmatrix} A_{ad} & 0 \\ B_{ed} C_{ad} & A_{ed} \end{bmatrix}$, $B_t = \begin{bmatrix} B_{ad} \\ 0 \end{bmatrix}$, $C_t = [D_{ed} C_{ad}, C_{ed}]$.

For the obtained prediction model, the state vector and the input vector are composed into a new augmented state vector, and the increment of the input vector is used as a new input vector to obtain augmented state space expressions of the aero-engine:

$$\begin{bmatrix} x_t(k+1) \\ u_t(k) \end{bmatrix} = \begin{bmatrix} A_t & B_t \\ 0 & I \end{bmatrix} \begin{bmatrix} x_t(k) \\ u(k-1) \end{bmatrix} + \begin{bmatrix} B_t \\ I \end{bmatrix} \Delta u(k) \qquad (33)$$

$$y_t(k) = C_t x_t(k) \qquad (34)$$

wherein $\Delta u(k)$ is an increment vector of the control quantity within the k control cycle, and a new state space expression is written as a compact form:

$$x_t'(k+1) = A_t' x_t'(k) + B_t' \Delta u(k) \qquad (35)$$

$$y_t(k) = C_t x_t'(k) \qquad (36)$$

According to the state space expression of the aero-engine, a predictive field is set as 10 and a control field is set as 3 to obtain a general form of a prediction formula of a state sequence and an output sequence as follows:

$$\hat{x} = P_{xx} x_t'(k) + H_x \hat{u} \qquad (37)$$

$$\hat{y} = P x_t'(k) + H \hat{u} \qquad (38)$$

where, $\hat{x} = [x_t'^T(k+1), x_t'^T(k+2), \ldots, x_t'^T(k+10)]^T \qquad (39)$ $\hat{u} = [\Delta u^T(k), \Delta u^T(k+1), \ldots, \Delta u^T(k+9)]^T \qquad (40)$ $\hat{y} = [y_t'^T(k+1), y_t'^T(k+2), \ldots, y_t'^T(k+10)]^T \qquad (41)$ $$P_{xx} = \begin{bmatrix} A_t' \\ A_t'^2 \\ M \\ A_t'^{10} \end{bmatrix}, H_x = \begin{bmatrix} B_t' & 0 & 0 & L & 0 \\ A_t' B_t' & B_t' & 0 & L & 0 \\ A_t'^2 B_t' & A_t' B_t' & B_t' & L & 0 \\ M & M & M & M & M \\ A_t'^9 B_t' & A_t'^8 B_t' & A_t'^7 B_t' & 0 & 0 \end{bmatrix} \qquad (42)$$

$$P = \begin{bmatrix} C_t A_t' \\ C_t A_t'^2 \\ M \\ C_t A_t'^{10} \end{bmatrix}, H = \begin{bmatrix} C_t B_t' & 0 & 0 & L & 0 \\ C_t A_t' B_t' & C_t B_t' & 0 & L & 0 \\ C_t A_t'^2 B_t' & C_t A_t' B_t' & C_t B_t' & L & 0 \\ M & M & M & M & M \\ C_t A_t'^9 B_t' & C_t A_t'^8 B_t' & C_t A_t'^7 B_t' & 0 & 0 \end{bmatrix} \qquad (43)$$

According to the state space expressions of the system, the prediction formula of the state sequence, and the prediction formula of the output sequence, the following simplified form of the target function can be written:

$$J = [r - P x_t'(k) - H \hat{u}]^T [r - P x_t'(k) - H \hat{u}] - \lambda \hat{u}^T \hat{u} \qquad (44)$$

where, r is a controller input of a reference sequence; after expansion and combination, and elimination of the term that has no influence on J, the target function can be finally simplified as the following quadratic form:

$$J = \hat{u}^T [H^T H + \lambda J] \hat{u} + 2[x_t'^T P^T H - r^T H] \hat{u} \qquad (45)$$

An input constraint can be expressed as the following compact form:

$$C_c \hat{u} \leq L(\overline{U} - u(k-1)) \qquad (46)$$

$$-C_c \hat{u} \leq L(\underline{U} - u(k-1)) \qquad (47)$$

where, $$C_c = \begin{bmatrix} I & 0 & 0 & L \\ I & I & 0 & L \\ L & L & L & L \\ I & I & I & L \end{bmatrix}, L = \begin{bmatrix} I \\ I \\ M \\ I \end{bmatrix};$$

$\overline{U}$ and $\underline{U}$ are respectively an input matrix upper limit and an input matrix lower limit.

An output matrix constraint can be expressed as the following form:

$$H \hat{u} \leq \begin{bmatrix} \overline{Y} \\ \overline{Y} \\ M \\ \overline{Y} \end{bmatrix} - P x_t'(k) \qquad (48)$$

$$-H \hat{u} \leq -\begin{bmatrix} \underline{Y} \\ \underline{Y} \\ M \\ \underline{Y} \end{bmatrix} + P x_t'(k) \qquad (49)$$

where, $\overline{Y}$ and $\underline{Y}$ are respectively output matrix upper limit and lower limit.

According to the target function and the constraint condition, rolling optimization can be realized by solving a quadratic programming problem. After a control output increment sequence optimized is obtained, a header element of the sequence is taken as the actual control output within the next control cycle.

Step 4: applying the controller output obtained in step 3 to a controlled system and comparing the actual output of the aero-engine obtained by a sensor with an expected value to obtain a control error. The control error will be taken as a new reference sequence in the optimization process of the model prediction controller, will affect the form of the model prediction target function and will compensate for the influence of mismatching of the prediction model and external disturbance on the control performance, so as to ensure the stability and control accuracy of the control system. The output quantity of the engine related to the constraint conditions will be directly fed back to the model prediction controller so that the upper limit and the lower limit of the output variable matrix can be adjusted reasonably, to ensure that the engine input and output are not over the limit and ensure the stable and safe operation of the system.

In order to further describe the effect of the model prediction multivariate controller in the present embodiment, the validity of the method in the present invention is verified through a set of simulation experiments in which the engine is accelerated from the beginning and the afterburner is turned on and turned off until the deceleration process is entered.

The simulation operation time is 70 s. By taking the rotational speed of the high-pressure rotor of the engine and the exit pressure ratio of the turbine as the controlled variables, under the conditions of altitude of 0 km and flight speed of 0Ma, the temperatures before turbine of 1650K and 1700K are taken as engine safety constraint conditions respectively. At the same time, the control signals applied to the control actuator are required to meet the physical constraint conditions of changing amplitude and changing rate. The rotational speed of the high-pressure rotor is kept as 11622 r/min within 0-5 s and the exit pressure ratio of the turbine is 6. After 5 s, acceleration is started until a maximum state in which the afterburner is not turned on. In this state, the rotational speed of the high-pressure rotor is 14500 r/min and the exit pressure ratio of the turbine is 11. The fuel flow of the afterburner is increased to 5000 kg/h after 20 s from stabilization, and the control variables of the core engine are required to remain unchanged under the state of turning on the afterburner. The afterburner is turned off at 40 s. The afterburner is decelerated after 50 s from stabilization until reaching a predetermined new steady state point. The rotational speed of the high-pressure rotor of the new steady state point is 12000 r/min and the exit pressure ratio of the turbine is 6.5.

Figure 2:
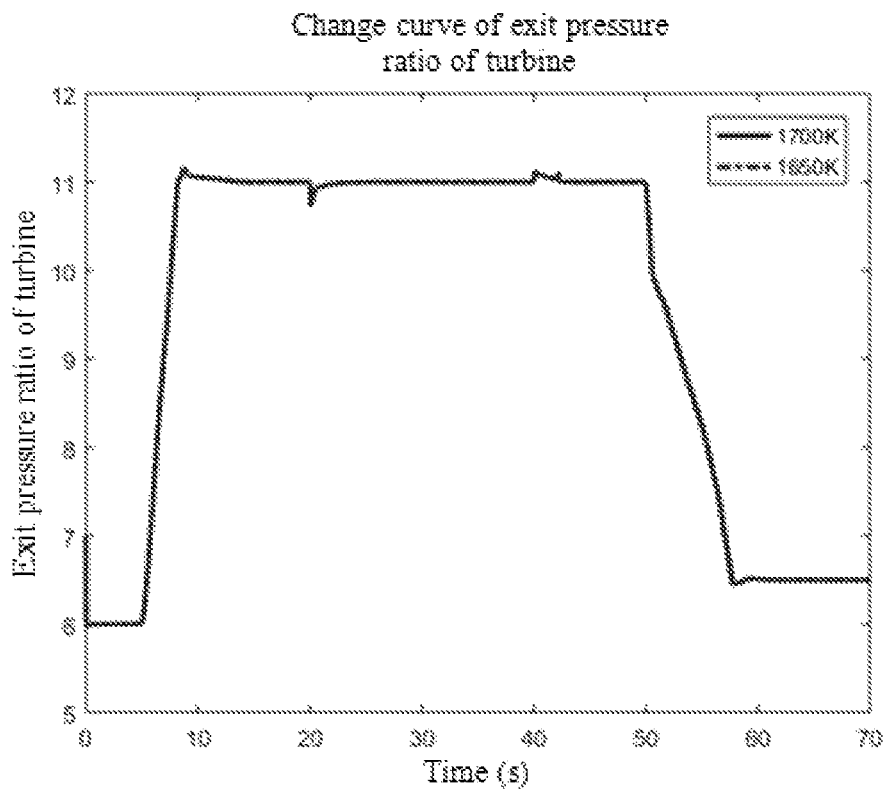
FIG. 2 is a change curve of exit pressure ratio of a turbine.
Figure 3:
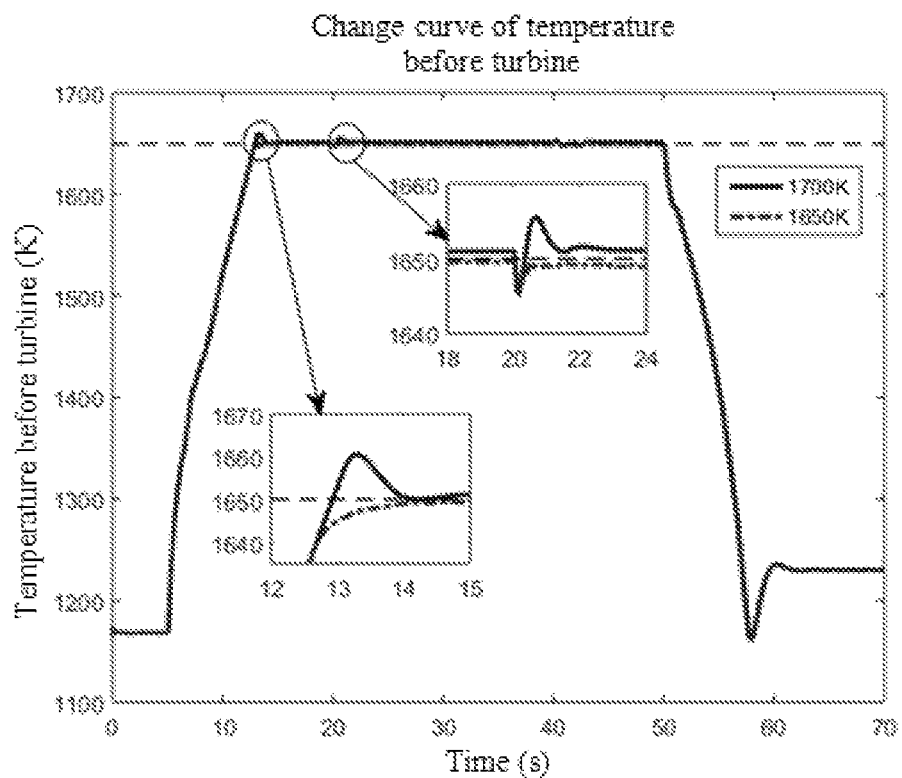
FIG. 3 is a change curve of temperature before turbine.
Figure 4:
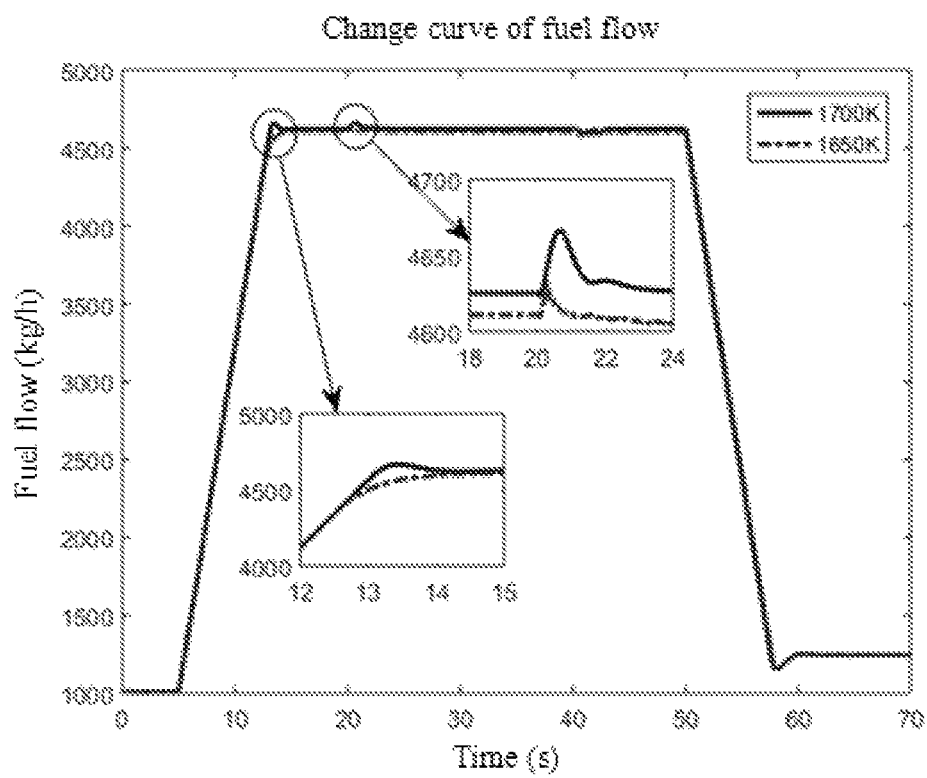
FIG. 4 is a change curve of fuel flow.
Figure 5:
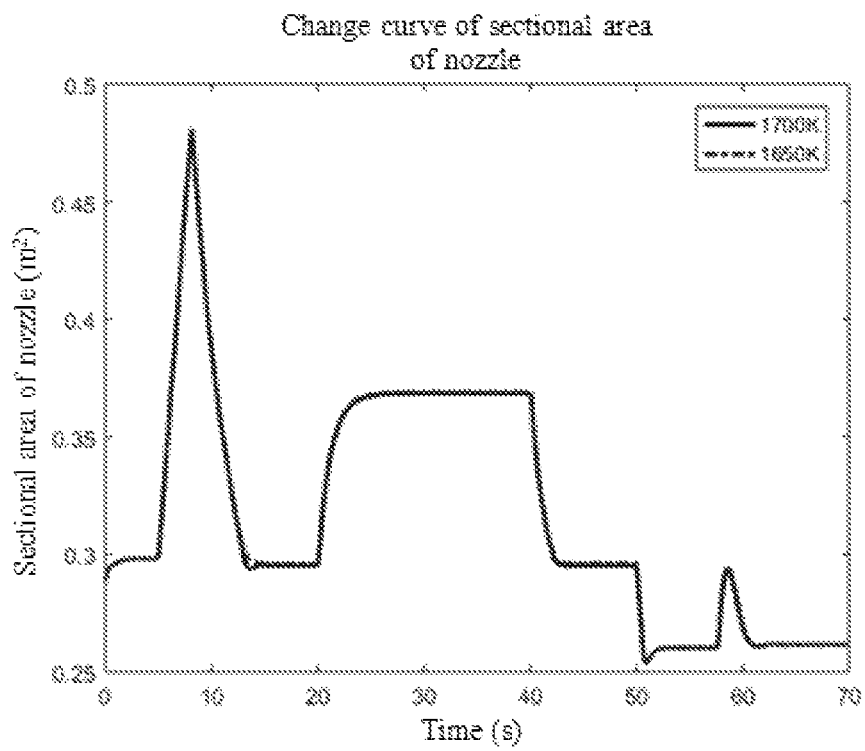
FIG. 5 is a change curve of a sectional area of a nozzle.
Figure 6:
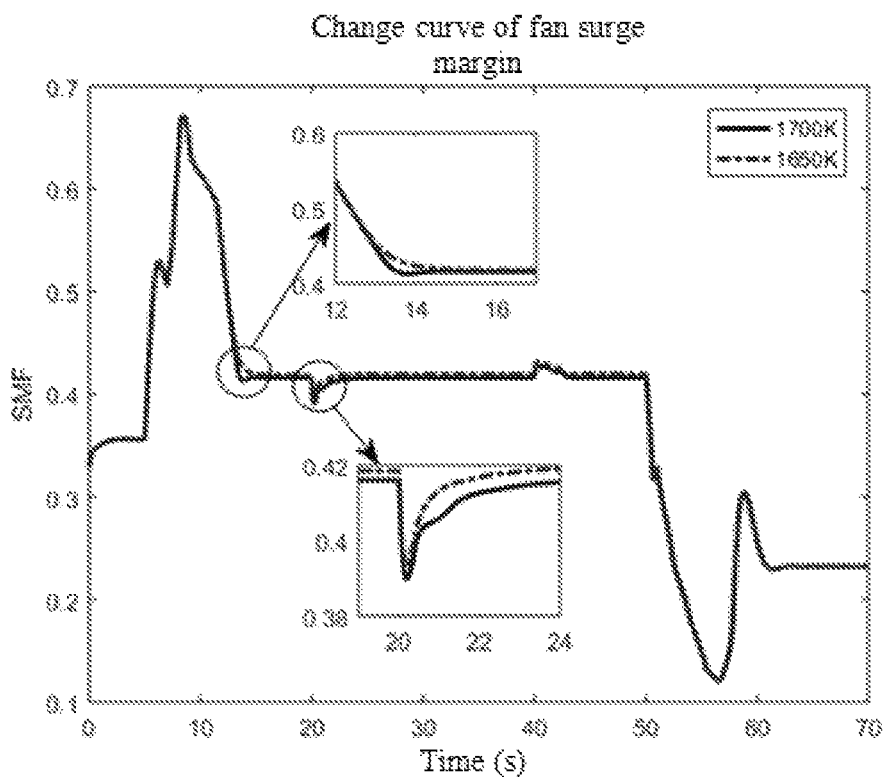
FIG. 6 is a change curve of fan surge margin.
Figure 7:
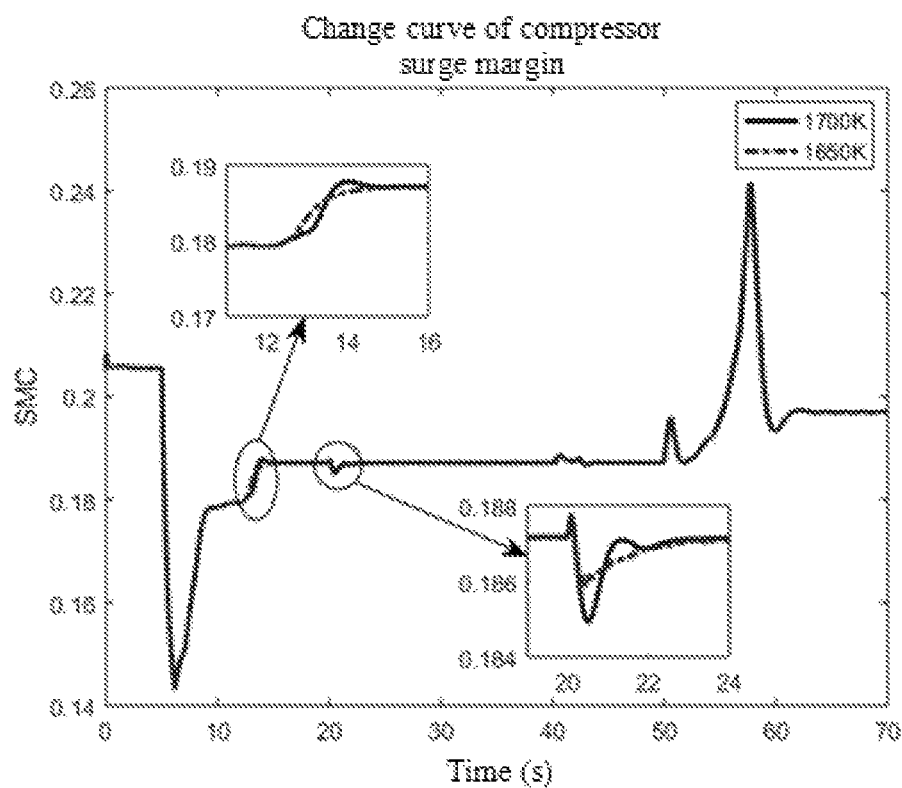
FIG. 7 is a change curve of compressor surge margin.
Figure 8:
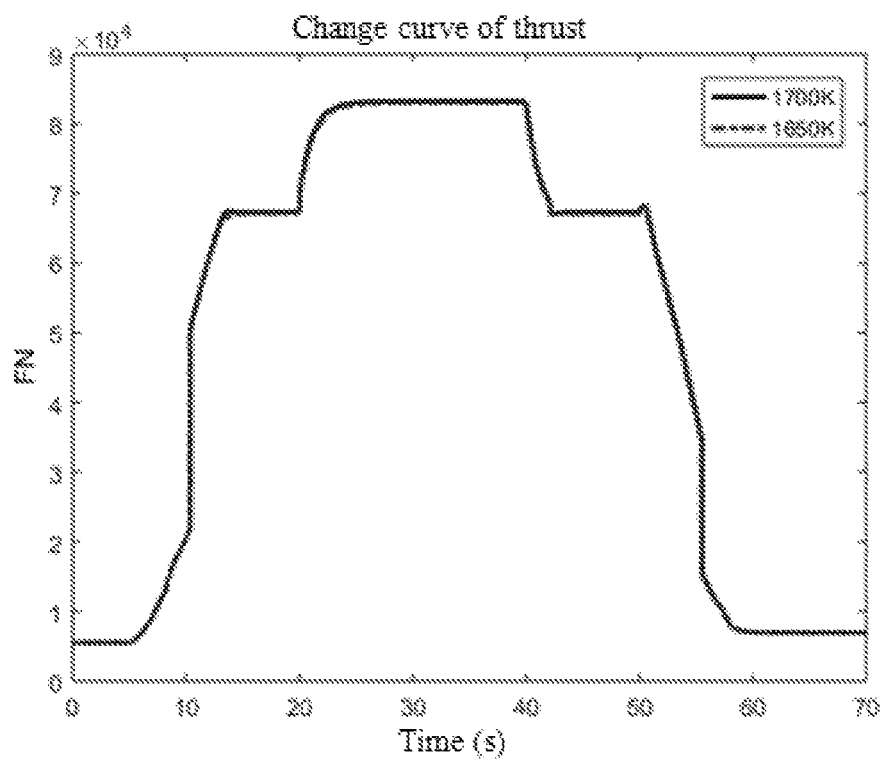
FIG. 8 is a change curve of engine thrust.

By observing FIGS. 1 and 2, it can be seen that the control variables and the control targets of the engine are fitted well. The control variables can also be well stabilized at the set level after the engine turns on afterburner. By observing FIG. 3, it can be found that the controller can well limit the temperature before turbine to a safe range. By observing FIG. 4 and FIG. 5, it can be found that the controller can meet the requirements of amplitude limit and speed limit of the actuator. It can be found from FIG. 6 and FIG. 7 that because the controlled variables meet the constraint requirements of the actuator, the fan surge margin and the compressor surge margin of the engine meet the safety needs. By observing FIG. 8, it can be found that although there are differences in the constraint conditions, the controller is still very effective for the actual thrust control of the engine.

To verify the applicability of the control system within the flight envelop, three points (2 km,0.2Ma), (5 km,0.5Ma) and (8 km,0.8Ma) are respectively taken within the flight envelop to conduct the simulation experiments in which the engine is accelerated from the beginning and the afterburner is turned on and turned off until the deceleration process is entered. The constraint conditions of the temperature before turbine are adjusted to 1800K according to the change of the working environment of the engine and actual physical characteristics of the components. The control signals of the control actuator also meet the physical constraint conditions of changing amplitude and changing rate. The simulation process of 70 s is arranged as follows:

The rotational speed of the high-pressure rotor is kept as 11622 r/min within 0-5 s and the exit pressure ratio of the turbine is 7. After 5 s, acceleration is started until a maximum state in which the afterburner is not turned on. In this state, the rotational speed of the high-pressure rotor is 14500 r/min and the exit pressure ratio of the turbine is 11. The fuel flow of the afterburner is increased to 5000 kg/h after 20 s from stabilization, and the control variables of the core engine are required to remain unchanged under the state of turning on the afterburner. The afterburner is turned off at 40 s. The afterburner is decelerated after 50 s from stabilization until reaching a predetermined new steady state point. The rotational speed of the high-pressure rotor of the new steady state point is 12000 r/min and the exit pressure ratio of the turbine is 7.5.

Figure 9:
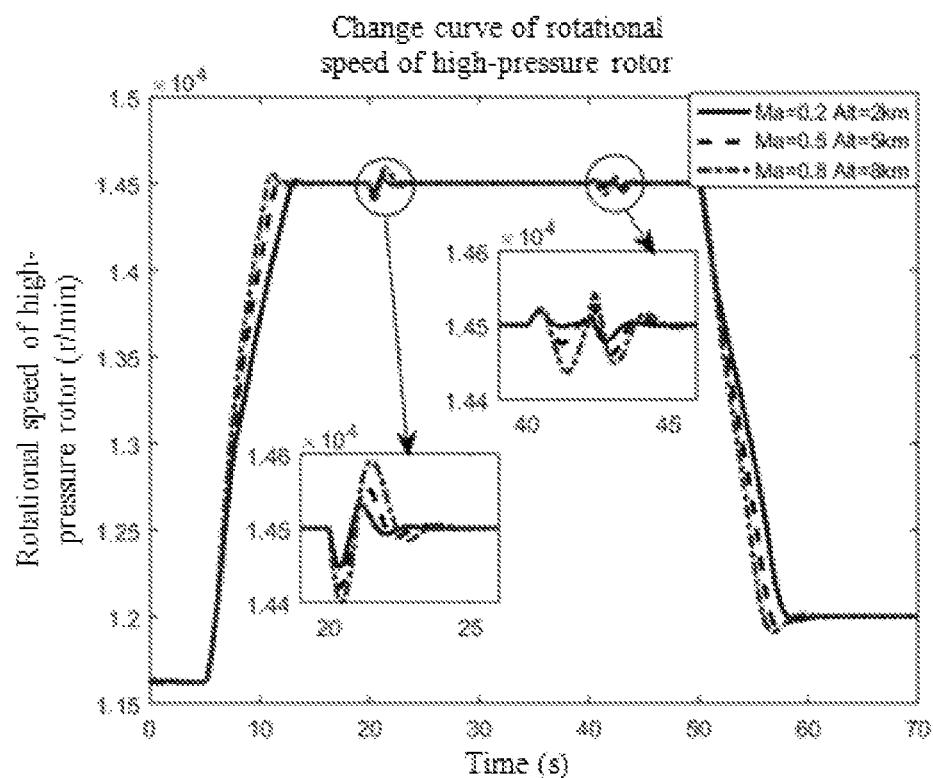
FIG. 9 is a contrast curve of rotational speed of a high-pressure rotor under different working conditions.
Figure 10:
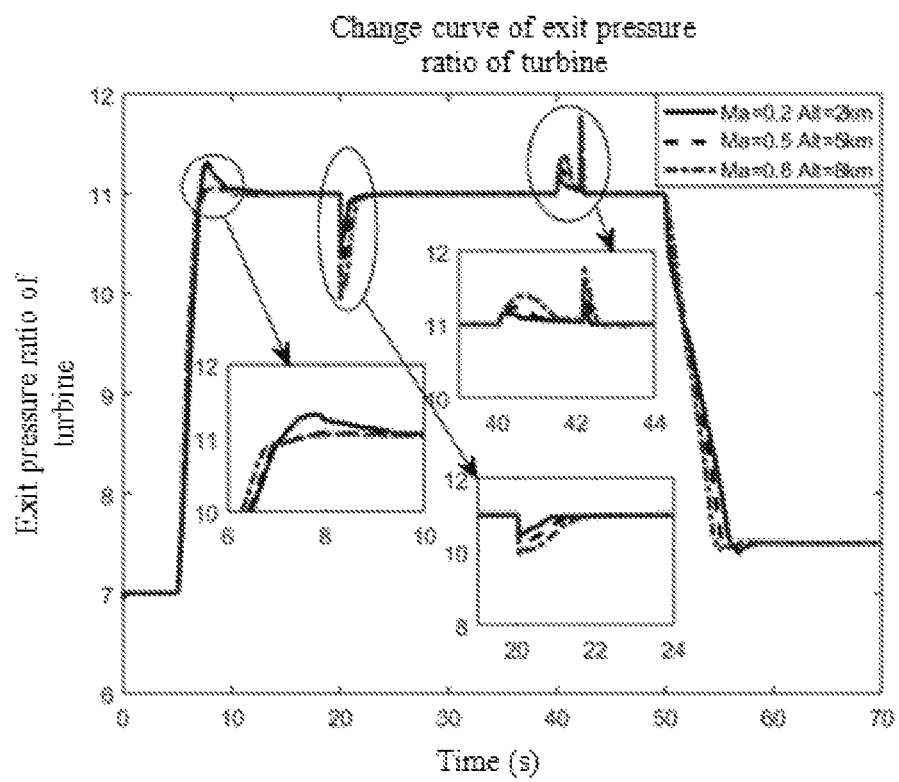
FIG. 10 is a contrast curve of exit pressure ratio of a turbine under different working conditions.
Figure 11:
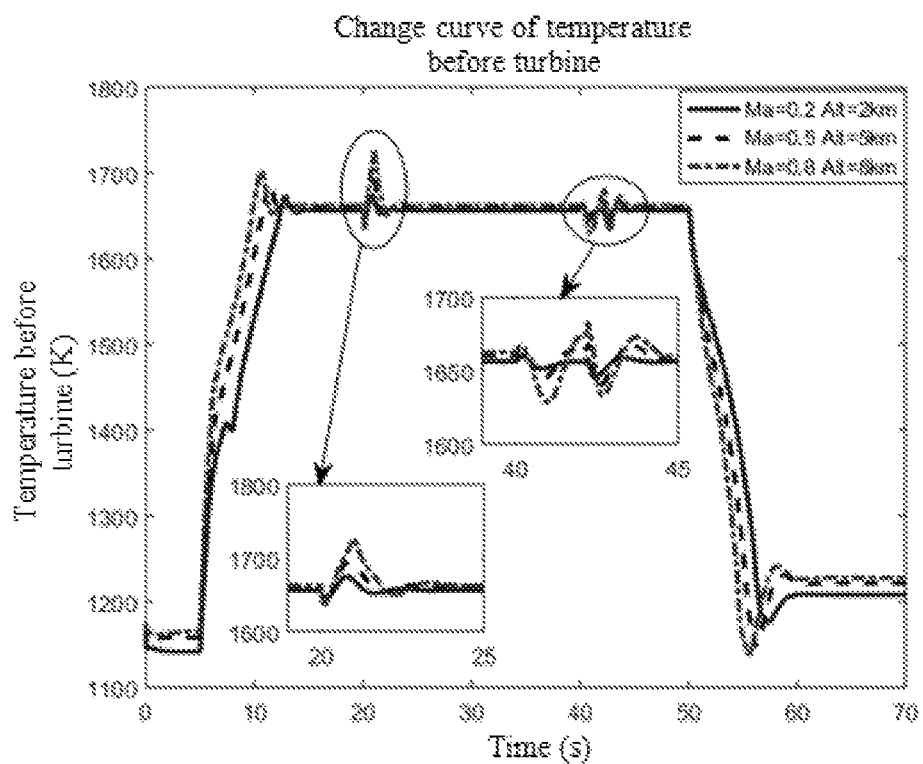
FIG. 11 is a contrast curve of temperature before turbine under different working conditions.
Figure 12:
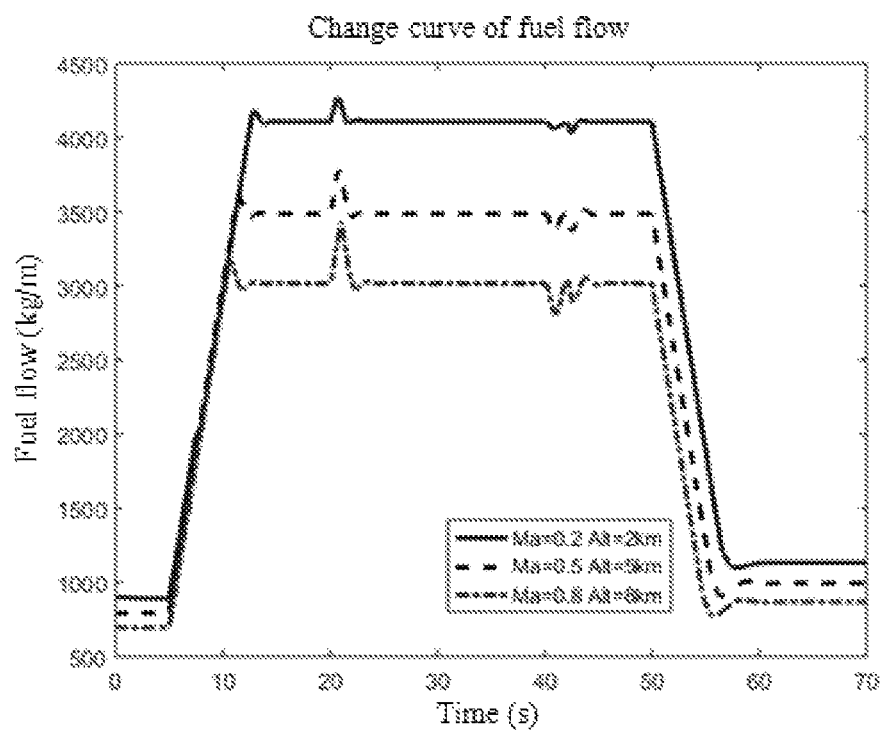
FIG. 12 is a contrast curve of fuel flow under different working conditions.
Figure 13:
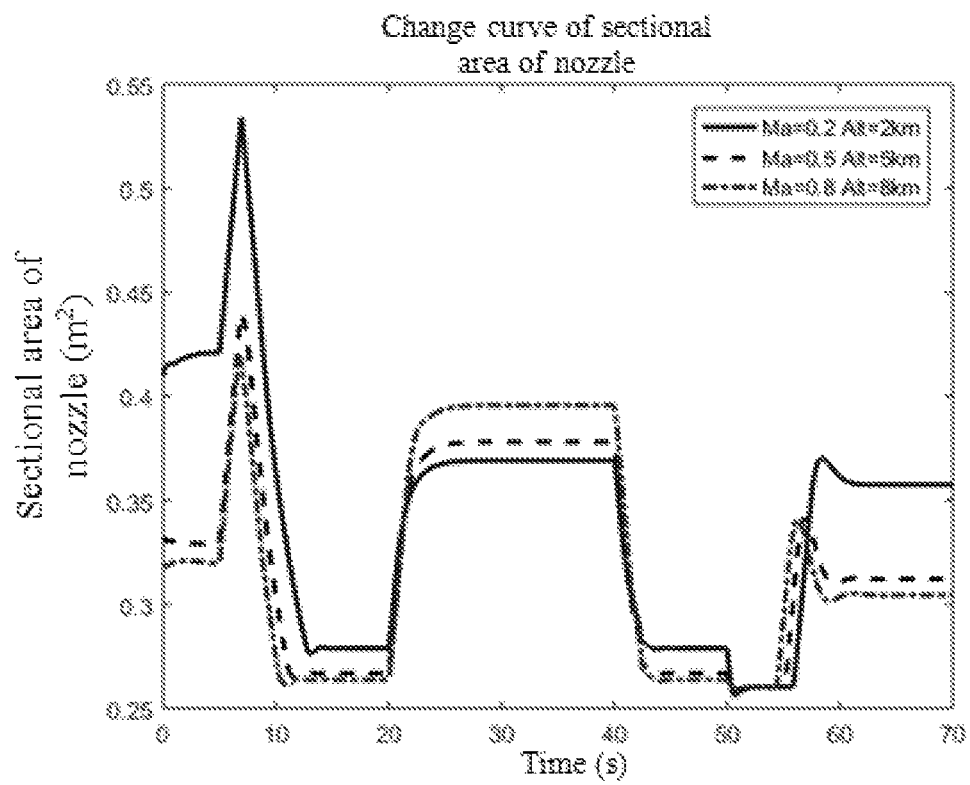
FIG. 13 is a contrast curve of sectional area of a nozzle under different working conditions.
Figure 14:
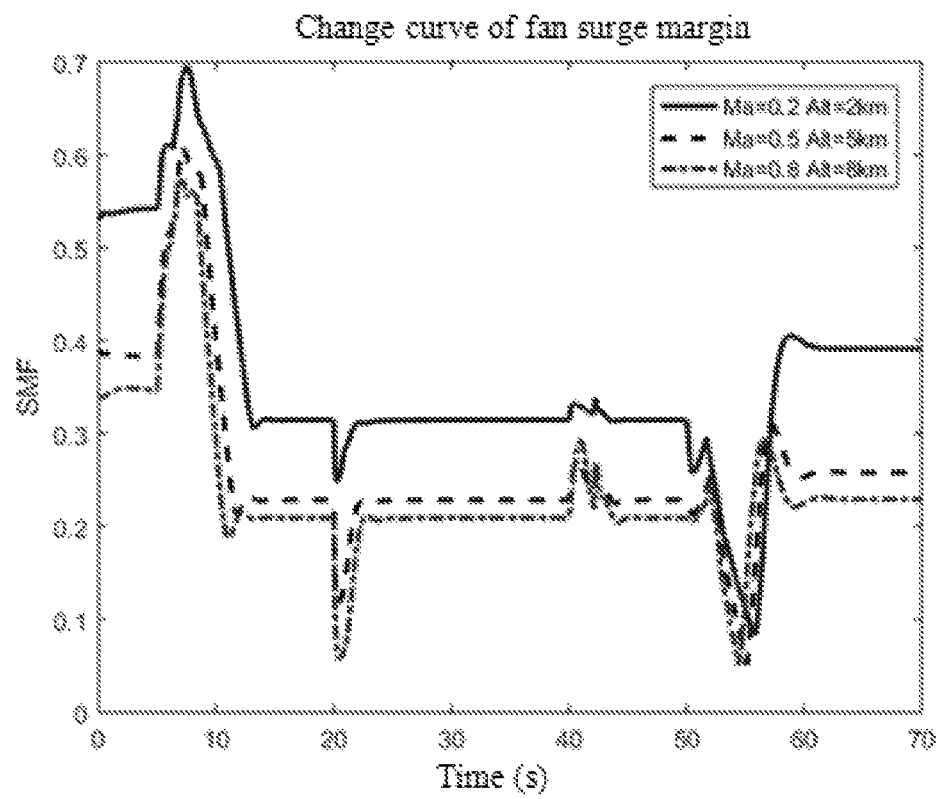
FIG. 14 is a contrast curve of fan surge margin under different working conditions.
Figure 15:
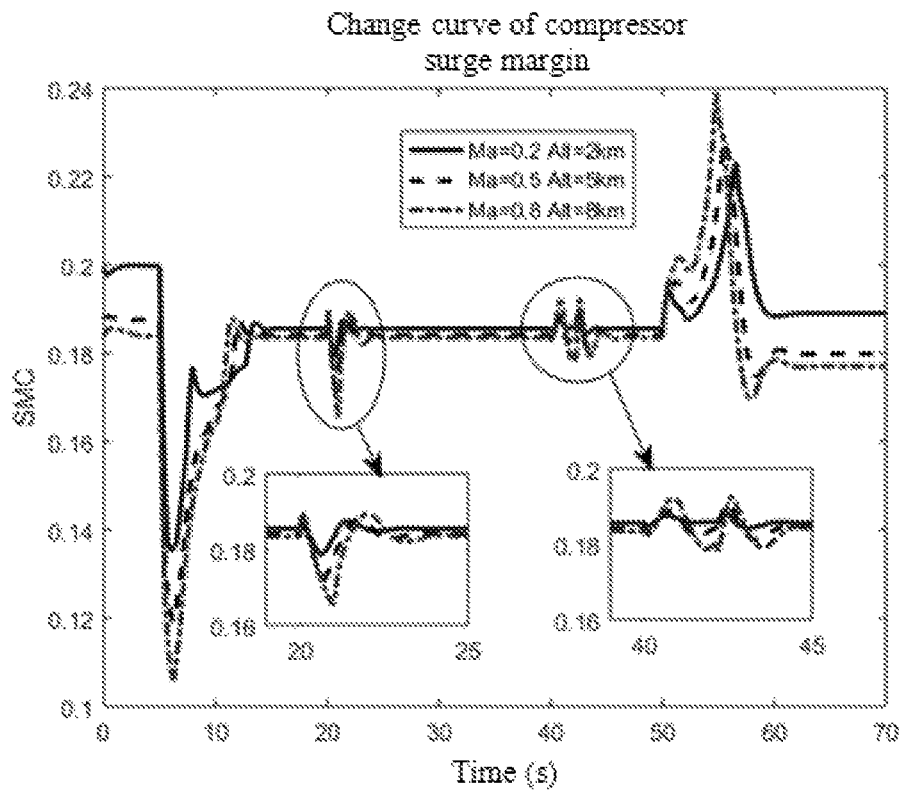
FIG. 15 is a change curve of compressor surge margin under different working conditions.
Figure 16:
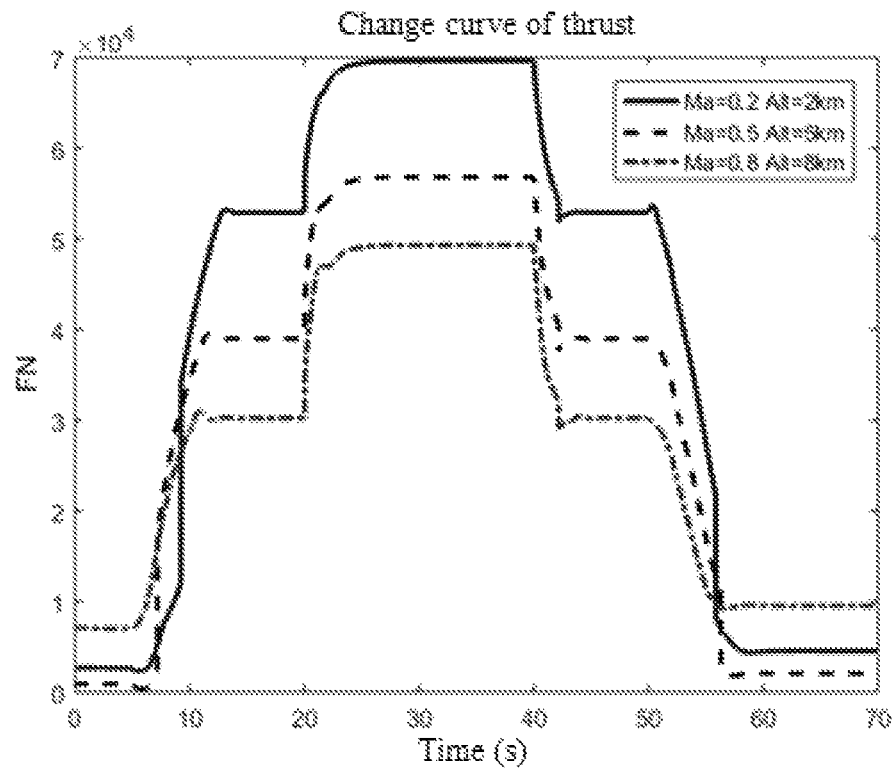
FIG. 16 is a contrast curve of engine thrust under different working conditions.
Figure 17:
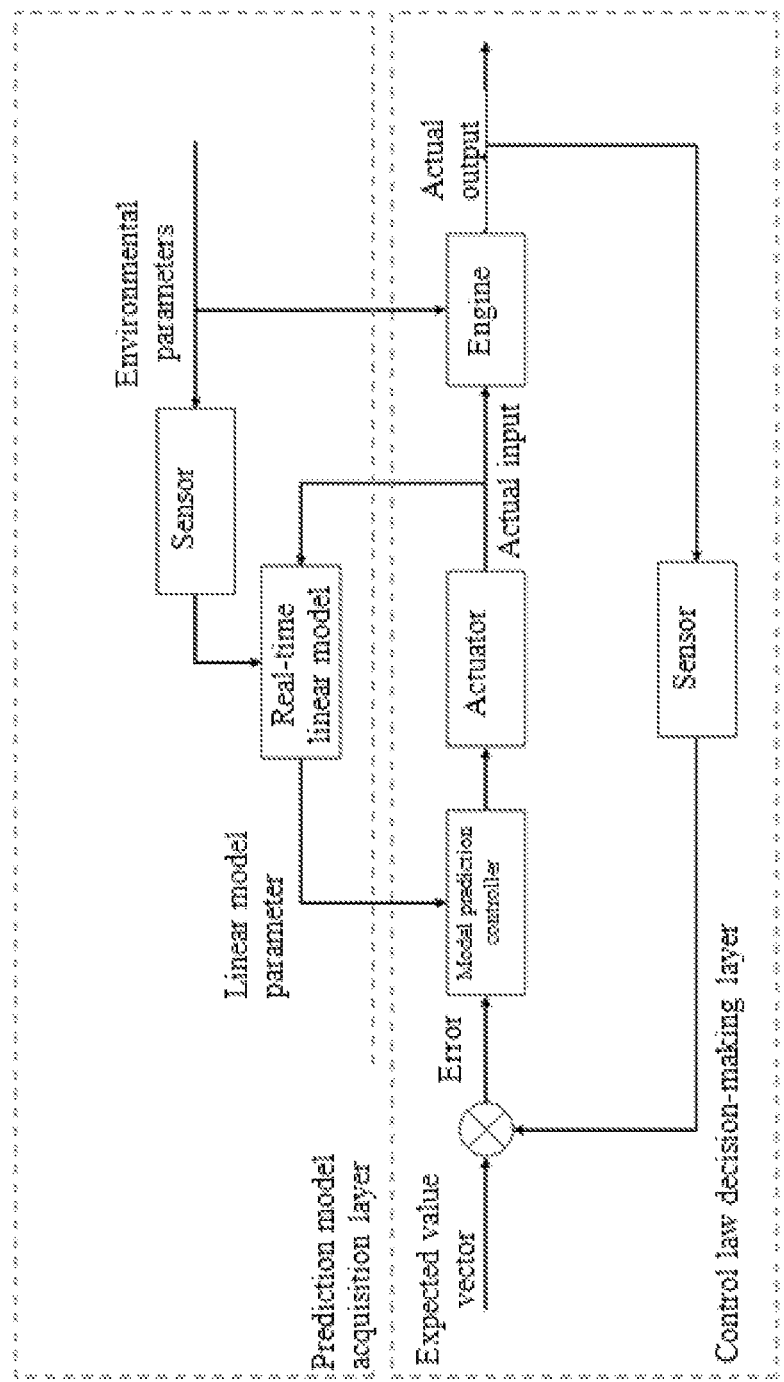
FIG. 17 is a structural diagram of an aero-engine on-line optimization and multivariable control system based on model prediction.

By observing FIGS. 9 and 10, it can be seen that steady state control variables and control targets of the engine under different working conditions are fitted well. The dynamic process is slightly different, which is relevant to the change of the control input of the engine under different working conditions. The control variables can also be well stabilized at the set level under different working conditions after the engine turns on afterburner. By observing FIG. 11, it can be found that the controller can well limit the temperature before turbine to a safe range. By observing FIGS. 12 and 13, it can be found that the control inputs of the engine are different under different working conditions, thereby causing the difference in the dynamic process in FIG. 9 and FIG. 10. It can be found from FIG. 14 and FIG. 15 that the fan surge margin and the compressor surge margin of the engine meet the safety needs. However, it can be obviously found that the safety margins under different working conditions are different. By observing FIG. 16, it can be found that although the rotational speed of the high-pressure rotor and the exit pressure ratio of the turbine are the same, the actual thrusts of the engine will be different under different working conditions.

The invention claimed is:

1. A design method of aero-engine on-line optimization and multivariable control based on model prediction, a control system structure mainly consisting of two parts: the first part is a prediction model acquisition layer that continuously establishes a small deviation linear model of an aero-engine near different steady state points based on the actual operating state of the aero-engine in each control cycle and external environment parameters and that supplies model parameters to a controller; and the second part is a control law optimizing and decision-making layer that consists of a model prediction controller and an external output feedback and determines the control output of the controller by solving a linear optimization problem with constraint and closed-loop feedback effect, wherein the design method comprises the following specific steps:

S1. continuously establishing a small deviation linear model of an aero-engine taking the current actual operating state of the aero-engine and the external environment as steady state points in real time; the actual input of the aero-engine comprising a fuel flow of a main combustor, a fuel flow of an afterburner, a cross-sectional area of a nozzle, a fan guide vane angle, a compressor guide vane angle and other aero-engine controllable parameters; the external environment parameters comprising a flight altitude, a flight Mach number and other environmental parameters; obtaining the small deviation linear model of the aero-engine through a method of power extracting and expressing in the form of state space;

S2. normalizing the small deviation linear model of the aero-engine obtained in step S1, i.e., converting absolute increments of an input variable, a state variable and an output variable into relative increments about the steady state points through linear transformation; discretizing the normalized model so that the model parameters are convenient for use in digital control; a sampling cycle of discretization being the same as the control cycle;

S3. designing a model prediction multivariable controller; data stored in the controller comprising: linear model parameters of aero-engine normalization and discretization, a discretization model of an actuator and constraint conditions of the control system, wherein the control structure of the control system, the actuator and the aero-engine are two subsystems which are connected in series; the aero-engine and the actuator are combined in series in each control cycle into a state space expression of an entire system, and are extended into an augmented state space expression; for the on-line optimization part, constructing a target function of index minimization of the difference between predicted output and actual measured output, the change range of the input and other factors, and taking the limit of the actual input and output of the control system as the optimization constraint condition to online solve the linear optimization problem with constraints to obtain the control output of the next step;

S4. applying the controller output obtained in step S3 to a controlled system and comparing with the actual output of the aero-engine obtained by a sensor to obtain a control error as the input of the model prediction controller; and guiding the controller to make a decision on the controller output of the next step.

2. The design method of aero-engine on-line optimization and multivariable control based on model prediction according to claim 1, wherein the step of establishing a small deviation linear model of an aero-engine taking the actual input of the aero-engine and the external environment as steady state points is as follows:

S1.1 the corresponding steady state value of the fuel supplied to the aero-engine by the control system at the last moment is taken as the steady state point parameter of the small deviation linear model, and a corresponding dynamics balance equation is established according to a rotor of the aero-engine as an energy storage component:

$$\frac{\pi}{30} J\dot{n} = \Delta M$$

where J is a diagonal matrix formed by a rotational inertia of the rotor, the dimension of the diagonal matrix depends on the number of rotors of the aero-engine, $J\dot{n}$ is a derivative vector of each rotor of the aero-engine with respect to time, and $\Delta M$ is a residual moment vector of each rotor;

S1.2 the residual moment vector of each rotor is expressed according to an engine principle as follows:

$$\Delta M = \Delta M(n, u_{in}, u_{out})$$

where n is a vector formed by the rotational speed of each rotor of the aero-engine, $u_{in}$ is a vector formed by the control quantity and $u_{out}$ is a vector formed by an external environment variable to be considered;

S1.3 since the inertia of an aircraft is much larger than that of the aero-engine, the change of the environmental parameters is not considered when the dynamics equation is established, and the expression of the residual moment vector of the rotor is approximately linearized to:

$$\Delta M = Jac \begin{bmatrix} \Delta n \\ \Delta u_{in} \end{bmatrix}$$

where Jac is a Jacobian matrix of $\Delta M$ with respect to n and $u_{in}$, $\Delta n$ and $\Delta u_{in}$ are column vectors, the element of $\Delta n$ is the absolute increment of the rotational speed of each rotor relative to the rotational speed of the steady state point, and the element of $\Delta u_{in}$ is the absolute increment of each control quantity relative to the control quantity of the steady state point;

S1.4 an item $$\frac{\pi}{30} J$$

is moved to the right end of the equal sign, and Jac is divided into a matrix A and a matrix B to obtain the following rotor dynamics equation:

$$\dot{n} = A\Delta n + B\Delta u_{in}$$

S1.5 under the condition of only considering the rotor inertia, the pressure and the temperature of each section of the aero-engine and the thrust of the aero-engine are functions of the rotational speed, the input and the environmental parameters, and expressed as: $y = y(n, u_{in}, u_{out})$; is expressed as an arbitrary parameter of the aero-engine other than the rotational speed; after the disturbance of the environmental parameters in the current control cycle are neglected, the expression of the aero-engine parameters are linearized as:

$$\Delta y = C\Delta n + D\Delta u_{in}$$

where $\Delta y$ is a column vector, and the element thereof is an absolute increment of each aero-engine parameter other than the rotational speed relative to the steady state point;

S1.6 elements of the matrixes A, B, C, D are determined by corresponding partial derivatives; the corresponding partial derivatives are obtained by change values of the steady state parameters caused by small disturbance; the rotor dynamics equation of the aero-engine in step S1.4 is combined with the engine parameter expression in step S1.5 to obtain state space expressions of the small deviation linear model of the aero-engine:

$$\begin{cases} \dot{n} = A\Delta n + B\Delta u_{in} \\ y = C\Delta n + D\Delta u_{in} \end{cases}.$$

3. The design method of aero-engine on-line optimization and multivariable controller based on model prediction according to claim 1, wherein the step of conducting normalization and discretization on the obtained small deviation linear model of the aero-engine is as follows:
   S2.1 absolute increments of an input vector, a state vector and an output vector obtained in step S1 in the state space expressions are converted into relative increments; the expressions of nondimensional relative increments are indicated as follows:

$$\dot{n}_s = \frac{\dot{n}}{n_m}, \Delta n_s = \frac{\Delta n}{n_m}, \Delta u_{ins} = \frac{\Delta u_{in}}{u_m} \text{ and } y_s = \frac{\Delta y}{y_m}$$

where the subscript s indicates a vector after nondimensionalization; the subscripts m, n, u and y indicate the steady state points, the state quantity, the input quantity and the output quantity of the aero-engine;
   S2.2 the state space expressions of the aero-engine near the steady state points are converted into the following form:

$$\dot{n} = A_e \Delta n + B_e \Delta u_{in}$$
$$y = C_e \Delta n + D_e \Delta u_{in}$$

where $A_e = N^{-1} AN$, $B_e = N^{-1} BU$, $C_e = Y^{-1} CN$, $D_e = Y^{-1} DU$ and N, Y, U are respectively diagonal matrixes formed by the state quantity, the output quantity and the input quantity on the steady state points;
   S2.3 the small deviation linear model of the aero-engine is discretized; the sampling cycle of discretization shall be consistent with the control cycle of the control system; and general forms of the state space expressions after discretization are indicated as follows:

$$\begin{cases} n(k+1) = A_{ed} n(k) + B_{ed} u_{in}(k) \\ y(k) = C_{ed} n(k) + D_{ed} u_{in}(k) \end{cases}$$

where $A_{ed}$, $B_{ed}$, $C_{ed}$ and $D_{ed}$ are discretized parameter matrixes.

4. The design method of aero-engine on-line optimization and multivariable controller based on model prediction according to claim 3, wherein the step of designing a model prediction multivariable controller and on-line optimization is as follows:
   S3.1 the influence of the actuator is considered; the actuator is approximated as a first-order inertial link; the state space expressions of the actuator are written as follows:

$$\begin{cases} \dot{x} = A_a x + B_a u \\ y' = x \end{cases}$$

where $A_a$ is a diagonal matrix formed by a time constant negative derivative of the actuator; $B_a$ is a diagonal matrix formed by a time constant derivative of the actuator, and the state space expression of the actuator is discretized in accordance with the same sampling time as the control cycle as follows:

$$\begin{cases} x(k+1) = A_{ad} x(k) + B_{ad} u(k) \\ y'(k) = x(k) \end{cases}$$

where $A_{ad}$ and $B_{ad}$ are respectively a system matrix and an input matrix after discretization of the state space expressions of the actuator;
   S3.2 the actuator and the engine model are integrated in series into a unified state space expression as follows:

$$x_t(k+1) = A_t x_t(k) + B_t u_t(k)$$
$$y_t(k) = C_t x_t(k)$$

where, $x_t = [x, \Delta n]^T$, $u_t = \Delta u_{in}^T$, $y_t = [\Delta n, \Delta y]^T$, $$A_t = \begin{bmatrix} A_{ad} & 0 \\ B_{ed} C_{ad} & A_{ed} \end{bmatrix}, B_t = \begin{bmatrix} B_{ad} \\ 0 \end{bmatrix}, C_t = [D_{ed} C_{ad}, C_{ed}];$$

S3.3 further, the state vector and the input vector are composed into a new augmented state vector, and the increment of the input vector is used as a new input vector to obtain augmented state space expressions:

$$\begin{bmatrix} x_t(k+1) \\ u_t(k) \end{bmatrix} = \begin{bmatrix} A_t & B_t \\ 0 & I \end{bmatrix} \begin{bmatrix} x_t(k) \\ u_t(k-1) \end{bmatrix} + \begin{bmatrix} B_t \\ I \end{bmatrix} \Delta u_t(k)$$
$$y_t(k) = C_t x_t(k)$$

where $\Delta u(k)$ is an increment vector of the control quantity within the kth control cycle, and a new state space expression is written as a compact form:

$$x_t'(k+1) = A_t' x_t'(k) + B_t' \Delta u(k)$$

$$y_t(k) = C_t x_t(k);$$

according to the state space expression of the aero-engine, a predictive field is set as p and a control field is set as q to obtain a general form of a prediction formula of a state sequence and an output sequence as follows:

$$\hat{x} = P_{xx} x_t'(k) + H_x \hat{u}$$
$$\hat{y} = P x_t'(k) + H \hat{u}$$

where, $\hat{x} = \left[ x_t'^T(k+1), x_t'^T(k+2), \ldots, x_t'^T(k+p) \right]^T$
$\hat{u} = \left[ \Delta u^T(k), \Delta u^T(k+1), \ldots, \Delta u^T(k+p-1) \right]^T$
$\hat{y} = \left[ y_t'^T(k+1), y_t'^T(k+2), \ldots, y_t'^T(k+p) \right]^T$ $$P_{xx} = \begin{bmatrix} A_t' \\ A_t'^2 \\ \vdots \\ A_t'^p \end{bmatrix}, H_x = \begin{bmatrix} B_t' & 0 & \cdots & \cdots & \cdots & 0 \\ A_t' B_t' & B_t' & \cdots & \cdots & \cdots & 0 \\ A_t'^2 B' & A_t' B' & \cdots & \cdots & \cdots & 0 \\ \vdots & \vdots & \vdots & \vdots & \vdots & 0 \\ A_t'^{p-1} B' & A_t'^{p-2} B' & \cdots & A_t'^{p-q} B' & \cdots & 0 \end{bmatrix}$$

-continued $$P = \begin{bmatrix} C_t A'_t \\ C_t A'^2_t \\ \vdots \\ C_t A'^p_t \end{bmatrix}, H = \begin{bmatrix} C_t B'_t & 0 & \cdots & \cdots & \cdots & 0 \\ C_t A'_t B'_t & C_t B'_t & \cdots & \cdots & \cdots & 0 \\ C_t A'^2_t B' & C_t A'_t B' & \cdots & \cdots & \cdots & 0 \\ \vdots & \vdots & \vdots & \vdots & \vdots & 0 \\ C_t A'^{p-1}_t B' & C_t A'^{p-2}_t B' & \cdots & C_t A'^{p-q}_t B' & \cdots & 0 \end{bmatrix};$$

according to the state space expressions, the prediction formula of the state sequence, and the prediction formula of the output sequence of the system, an on-line optimization target can be described as the following simplified form of the target function:

$$J = [r - Px_t'(k) - H\hat{u}]^T [r - Px_t'(k) - H\hat{u}] - \lambda \hat{u}^T \hat{u}$$

where, r is a controller input of a reference sequence; after expansion and combination, and elimination of the term that has no influence on J, the target function can be finally simplified as the following quadratic form:

$$J = \hat{u}^T [H^T H + \lambda I] \hat{u} + 2[x_t'^T P^T H - r^T H] \hat{u};$$

an input constraint is expressed as the following compact form:

$$C_c \hat{u} \leq L(\overline{U} - u(k-1))$$

$$-C_c \hat{u} \leq L(\underline{U} - u(k-1))$$

where, $$C_c = \begin{bmatrix} I & 0 & 0 & \cdots \\ I & I & 0 & \cdots \\ \cdots & \cdots & \cdots & \cdots \\ I & I & I & \cdots \end{bmatrix}, L = \begin{bmatrix} I \\ I \\ \vdots \\ I \end{bmatrix};$$

$\overline{U}$ and $\underline{U}$ are respectively an input quantity upper limit and an input matrix lower limit;

an output constraint is expressed as the following form:

$$H\hat{u} \leq \begin{bmatrix} \overline{Y} \\ \overline{Y} \\ \vdots \\ \overline{Y} \end{bmatrix} - Px_t'(k)$$

$$-H\hat{u} \leq -\begin{bmatrix} \underline{Y} \\ \underline{Y} \\ \vdots \\ \underline{Y} \end{bmatrix} + Px_t'(k)$$

where, $\overline{Y}$ and $\underline{Y}$ are respectively output quantity upper limit and lower limit;

according to the target function and the constraint condition, on-line rolling optimization is realized by solving a quadratic programming problem; and a header element of the control quantity increment sequence obtained by optimization, and the control quantity of the previous control cycle are summed to use the sum as an actual control quantity within the next control cycle.

5. The design method of aero-engine on-line optimization and multivariable controller based on model prediction according to claim 1, wherein the step of designing a model prediction multivariable controller and on-line optimization is as follows:

S3.1 the influence of the actuator is considered; the actuator is approximated as a first-order inertial link; the state space expressions of the actuator are written as follows:

$$\begin{cases} \dot{x} = A_a x + B_a u \\ y' = x \end{cases}$$

where $A_a$ is a diagonal matrix formed by a time constant negative derivative of the actuator; $B_a$ is a diagonal matrix formed by a time constant derivative of the actuator, and the state space expression of the actuator is discretized in accordance with the same sampling time as the control cycle as follows:

$$\begin{cases} x(k+1) = A_{ad} x(k) + B_{ad} u(k) \\ y'(k) = x(k) \end{cases}$$

where $A_{ad}$ and $B_{ad}$ are respectively a system matrix and an input matrix after discretization of the state space expressions of the actuator;

S3.2 the actuator and the engine model are integrated in series into a unified state space expression as follows:

$$x_t(k+1) = A_t x_t(k) + B_t u_t(k)$$

$$y_t(k) = C_t x_t(k)$$

where, $x_t = [x, \Delta n]^T$, $u_t = \Delta u_{in}^T$, $y_t = [\Delta n, \Delta y]^T$, $$A_t = \begin{bmatrix} A_{ad} & 0 \\ B_{ed} C_{ad} & A_{ed} \end{bmatrix}, B_t = \begin{bmatrix} B_{ad} \\ 0 \end{bmatrix}, C_t = [D_{ed} C_{ad}, C_{ed}];$$

S3.3 further, the state vector and the input vector are composed into a new augmented state vector, and the increment of the input vector is used as a new input vector to obtain augmented state space expressions:

$$\begin{bmatrix} x_t(k+1) \\ u_t(k) \end{bmatrix} = \begin{bmatrix} A_t & B_t \\ 0 & I \end{bmatrix} \begin{bmatrix} x_t(k) \\ u_t(k-1) \end{bmatrix} + \begin{bmatrix} B_t \\ I \end{bmatrix} \Delta u_t(k)$$

$$y_t(k) = C_t x_t(k)$$

where, $\Delta u(k)$ is an increment vector of the control quantity within the kth control cycle, and a new state space expression is written as a compact form:

$$x_t'(k+1) = A_t' x_t'(k) + B_t' \Delta u(k)$$

$$y_t(k) = C_t' x_t'(k);$$

according to the state space expression of the aero-engine, a predictive field is set as p and a control field is set as q to obtain a general form of a prediction formula of a state sequence and an output sequence as follows:

$$\hat{x} = P_{xx} x_t'(k) + H_x \hat{u}$$

$$\hat{y} = P x_t'(k) + H \hat{u}$$

where, $\hat{x} = [x_t'^T(k+1), x_t'^T(k+2), \ldots, x_t'^T(k+p)]^T$ $\hat{u} = [\Delta u^T(k), \Delta u^T(k+1), \ldots, \Delta u^T(k+p-1)]^T$ $\hat{y} = [y_t'^T(k+1), y_t'^T(k+2), \ldots, y_t'^T(k+p)]^T$ -continued $$P_{xx} = \begin{bmatrix} A'_t \\ A'^2_t \\ \vdots \\ A'^p_t \end{bmatrix}, H_x = \begin{bmatrix} B'_t & 0 & \cdots & \cdots & \cdots & 0 \\ A'_t B'_t & B'_t & \cdots & \cdots & \cdots & 0 \\ A'^2_t B' & A'_t B' & \cdots & \cdots & \cdots & 0 \\ \vdots & \vdots & \vdots & \vdots & \vdots & 0 \\ A'^{p-1}_t B' & A'^{p-2}_t B' & \cdots & A'^{p-q}_t B' & \cdots & 0 \end{bmatrix}$$

$$P = \begin{bmatrix} C_t A'_t \\ C_t A'^2_t \\ \vdots \\ C_t A'^p_t \end{bmatrix}, H = \begin{bmatrix} C_t B'_t & 0 & \cdots & \cdots & \cdots & 0 \\ C_t A'_t B'_t & C_t B'_t & \cdots & \cdots & \cdots & 0 \\ C_t A'^2_t B' & C_t A'_t B' & \cdots & \cdots & \cdots & 0 \\ \vdots & \vdots & \vdots & \vdots & \vdots & 0 \\ C_t A'^{p-1}_t B' & C_t A'^{p-2}_t B' & \cdots & C_t A'^{p-q}_t B' & \cdots & 0 \end{bmatrix};$$

according to the state space expressions, the prediction formula of the state sequence, and the prediction formula of the output sequence of the system, an on-line optimization target can be described as the following simplified form of the target function:

$$J = [r - Px'_t(k) - H\hat{u}^T[\ ]r - Px'_t(k) - H\hat{u}] - \lambda \hat{u}^T \hat{u}$$

where, r is a controller input of a reference sequence; after expansion and combination, and elimination of the term that has no influence on J, the target function can be finally simplified as the following quadratic form:

$$J = \hat{u}^T[H^T H + \lambda T]\hat{u} + 2[x_t^T P^T H - r^T H]\hat{u};$$

an input constraint is expressed as the following compact form:

$$C_c \hat{u} - L(\overline{U} - u(k-1))$$

$$-C_c \hat{u} L(\underline{U} - u(k-1))$$

where, $$C_c = \begin{bmatrix} I & 0 & 0 & \cdots \\ I & I & 0 & \cdots \\ \cdots & \cdots & \cdots & \cdots \\ I & I & I & \cdots \end{bmatrix}, L = \begin{bmatrix} I \\ I \\ \vdots \\ I \end{bmatrix};$$

$\overline{U}$ and $\underline{U}$ are respectively an input quantity upper limit and an input matrix lower limit;

an output constraint is expressed as the following form:

$$H\hat{u} \leq \begin{bmatrix} \overline{Y} \\ \overline{Y} \\ \vdots \\ \overline{Y} \end{bmatrix} - Px'_t(k)$$

$$-H\hat{u} \leq -\begin{bmatrix} \underline{Y} \\ \underline{Y} \\ \vdots \\ \underline{Y} \end{bmatrix} + Px'_t(k)$$

where, $\overline{Y}$ and $\underline{Y}$ are respectively output quantity upper limit and lower limit;

according to the target function and the constraint condition, on-line rolling optimization is realized by solving a quadratic programming problem; and a header element of the control quantity increment sequence obtained by optimization, and the control quantity of the previous control cycle are summed to use the sum as an actual control quantity within the next control cycle.

\* \* \* \* \*